US011393337B2

(12) United States Patent
Petluru et al.

(10) Patent No.: US 11,393,337 B2
(45) Date of Patent: Jul. 19, 2022

(54) SYSTEM AND INTERACTION METHOD TO ENABLE IMMERSIVE NAVIGATION FOR ENFORCEMENT ROUTING

(71) Applicant: Conduent Business Services, LLC, Florham Park, NJ (US)

(72) Inventors: Snigdha Petluru, Secunderabad (IN); Suchismita Naik, Bangalore (IN); Nupur Labh, Iblur Village (IN); Prateek Srivastava, Kanpur (IN); Neeraj Gudipati, Bangalore (IN); Sourav Bhattacharya, Kolkata (IN); Eduardo Cardenas, Austin, TX (US); Matthew Darst, Chicago, IL (US); Archana Ramakrishnan, Bangalore (IN)

(73) Assignee: Conduent Business Services, LLC, Florham Park, NJ (US)

( * ) Notice: Subject to any disclaimer, the term of this patent is extended or adjusted under 35 U.S.C. 154(b) by 0 days.

(21) Appl. No.: 16/740,407

(22) Filed: Jan. 11, 2020

(65) Prior Publication Data

US 2021/0217312 A1 Jul. 15, 2021

(51) Int. Cl.
*B60Q 1/48* (2006.01)
*G08G 1/14* (2006.01)
(Continued)

(52) U.S. Cl.
CPC ......... *G08G 1/148* (2013.01); *G01C 21/3415* (2013.01); *G01C 21/3685* (2013.01);
(Continued)

(58) Field of Classification Search
CPC .... G08G 1/148; G08G 1/017; G01C 21/3415; G01C 21/3685; G06F 3/04815; G06T 19/006
(Continued)

(56) References Cited

U.S. PATENT DOCUMENTS 5,740,050 A 8/1998 Ward, II
6,081,206 A 6/2000 Kielland
(Continued)

FOREIGN PATENT DOCUMENTS

EP 2 291 610 B1 11/2011

OTHER PUBLICATIONS

Eben Diskin, "How much U.S. cities make in parking ticket revenue will blow your mind", Matador Network, Mar. 14, 2019.
(Continued)

*Primary Examiner* — Naomi J Small
(74) *Attorney, Agent, or Firm* — Ortiz & Lopez, PLLC; Luis M. Ortiz; Kermit D. Lopez

(57) ABSTRACT

A method and system for parking enforcement, can include graphically displaying in a graphical user interface, a mixed reality display of data including some augmented reality data including parking enforcement information and real-time navigational cues for a navigation that account for a current location of a parking enforcement officer and one or more zones allocated to the parking enforcement officer, capturing license plate information to determine compliance with curbside regulations, and integrating a payment data source and a citation issuance application to issue a citation based on the license plate information.

20 Claims, 16 Drawing Sheets

(51) Int. Cl.
   G08G 1/017   (2006.01)
   G01C 21/36   (2006.01)
   G06F 3/04815 (2022.01)
   G01C 21/34   (2006.01)
   G06T 19/00   (2011.01)

(52) U.S. Cl.
   CPC ........ *G06F 3/04815* (2013.01); *G06T 19/006* (2013.01); *G08G 1/017* (2013.01)

(58) Field of Classification Search
   USPC ..................................................... 340/932.2
   See application file for complete search history.

(56) References Cited

U.S. PATENT DOCUMENTS

| | | | |
|---|---|---|---|
| 7,949,464 | B2 | 5/2011 | Kaplan et al. |
| 8,756,000 | B2 | 6/2014 | Tertoolen |
| 9,043,150 | B2 | 5/2015 | Forstall et al. |
| 9,759,659 | B2 | 9/2017 | Trum |
| 10,475,253 | B2 | 11/2019 | Yerkes et al. |
| 2004/0133464 | A1* | 7/2004 | Erskine ............. G06Q 10/02 705/13 |
| 2007/0029825 | A1* | 2/2007 | Franklin ........... G06Q 30/0284 340/932.2 |
| 2008/0291054 | A1* | 11/2008 | Groft ................. G08G 1/14 340/932.2 |
| 2012/0078686 | A1* | 3/2012 | Bashani ............. G07B 15/00 348/148 |
| 2015/0294431 | A1* | 10/2015 | Fiorucci ............. G07B 15/02 705/13 |
| 2015/0310070 | A1* | 10/2015 | Stefik ............... G06Q 10/06 707/740 |
| 2018/0060798 | A1* | 3/2018 | Stefik ........... G06Q 10/06311 |
| 2018/0350229 | A1* | 12/2018 | Yigit ................. G08G 1/04 |
| 2019/0304307 | A1* | 10/2019 | Huang ............... G08G 1/205 |
| 2019/0370923 | A1* | 12/2019 | Randall ............ G06Q 50/30 |
| 2020/0219390 | A1* | 7/2020 | Lyles ................ G06F 16/33 |

OTHER PUBLICATIONS

"Mixed Reality", Wikipedia, https://en.wikipedia.org/wiki/Mixed_reality, downloaded Nov. 12, 2019.
Amanda C. Haury, "U.S. Cities With The Largest Parking Fines", Investopedia, Nov. 13, 2019.
Melissa Sanchez and Sandhya Kambhampati, "How Chicago Ticket Debt Sends Black Motorists Into Bankruptcy", ProPublica Illinois' investigations, Feb. 27, 2018.
"What Parking Really Costs Drivers", carrentals.com, downloaded Nov. 13, 2019.
"Augmented Reality", Wikipedia, https://en.wikipedia.org/wiki/Augmented_reality, downloaded Nov. 12, 2019.
S Benhamou, "Orientation and Navigation", Encyclopedia of Behavioral Neuroscience, 2010, vol. 2, 497-503.
Olivier Trullier, et al., "Biologically-based Artificial Navigation Systems: Review and prospects", Progress in Neurobiology, Oct. 1996.
Noli Brazil, "The Unequal Spatial Distribution of City Government Fines: The Case of Parking Tickets in Los Angeles", Urban Affairs Review, Jun. 2018, https://www.researchgate.net/publication/325932965.
Elizabeth R. Chrastil and William H. Warren, "Active and Passive Spatial Learning in Human Navigation: Acquisition of Survey Knowledge", Journal of Experimental Psychology: Learning, Memory, and Cognition, American Psychological Association, 2013, vol. 39, No. 5, 1520-1537.
Herman, James, F.; Siegel, Alexander, W.; "The Development of Spatial Representations of Large-Scale Environments"; Pittsburgh University, Learning Research and Development Agency, 1977.
Chao Lei, Qian Zhang, Yanfeng Ouyang, "Planning of parking enforcement patrol considering drivers' parking payment behavior", Transportation Research Part B 106 (2017) 375-392.
Xinlu Liu, "Optimal Patrol Routing and Scheduling for Parking Enforcement Considering Drivers' Parking Behavior", Thesis, University of Illinois at Urbana-Champaign, 2015.
Fotis Liarokapis, Jonathan Raper and Vesna Brujic-Okretic, "Navigating within the urban environment using Location and Orientation-based Services", European Navigation Conference 2006, May 7-10, 2006.
Raphael Grasset, Alessandro Mulloni, Mark Billinghurst, and Dieter Schmalstieg, Chapter 18, "Navigation Techniques in Augmented and Mixed Reality: Crossing the Virtuality Continuum", Handbook of Augmented Reality Technologies and Applications, 2011.
Wolfgang Narzt, et al., "Pervasive Information Acquisition for Mobile AR-Navigation Systems", Proceedings of the Fifth IEEE Workshop on Mobile Computing Systems & Applications (WMSCA 2003).
Wei Shao, Flora D. Salim, Tao Gu, Ngoc-Thanh Dinh and Jeffrey Chan, "Travelling Officer Problem: Managing Car Parking Violations Efficiently Using Sensor Data", Dec. 2017.
Jan M. Wiener, Simon J. Büchner, Christoph Hölscher, "Taxonomy of Human Wayfinding Tasks: A Knowledge-Based Approach", Institute fur Informatik & Gesellschaft, Jun. 5, 2009.

* cited by examiner

SYSTEM AND INTERACTION METHOD TO ENABLE IMMERSIVE NAVIGATION FOR ENFORCEMENT ROUTING

TECHNICAL FIELD

Embodiments are related to the field of MR (Mixed Reality) and AR (Augmented Reality) applications. Embodiments further relate to the field of parking enforcement.

BACKGROUND

Parking enforcement involves the act of a state or city appointed official monitoring a designated area for potential parking violations and ensuring adherence to parking rules. Parking enforcement often involves a significant amount of guesswork. Enforcement personnel, for example, may not often know where and when to enforce curbside regulations. They may make assumptions, and those assumptions can lead to inequitable enforcement, including predatory enforcement (or the disproportionate issuance of citations in underserved neighborhoods or socio-economically deprived communities) and enforcement canvassing that may be inconsistent with the need to mitigate congestion, increase turnover, and promote public safety.

Conventional solutions to parking enforcement have involved the generation of fixed HTML maps that can be updated hourly. These fixed HTML maps can contain optimized routes derived from scoring algorithms that can predict the hourly probability of infractions, congestion mitigation, or other regulatory enforcement, and the need for turnover on a block-by-block basis. This type of tool can provide a Parking Enforcement Officer (PEO) with information about the likelihood of citations in their enforcement zone and the location and times various regulations are in effect.

Unfortunately, the routes are based on static mapping and not the PEO's real-time location. Furthermore, the routes do not incorporate real-time behavior such as blocks that may be already enforced (or real-time changes in violation probabilities due to public complaints or feedback from various technologies like sensors, CCTV, and parking meters), leaving the work to the PEO to make inferences about how he or she should enforce.

With the cost of approximately $345 spent per driver and over 17 hours spent over a year to search for a parking spot, more than 1.4 Billion dollars of revenue is generated from only 16 cities in the United States. San Francisco, N.Y., and Chicago rank highest among such cities with the highest parking fines. A deep dive into Los Angeles' parking ticketing data has shown that more frequently ticketed meters were often situated in areas where under-served communities resided. Research into Chicago's program, for example, has determined that the city's ticketing and debt collection practices disproportionately affect people in majority black and low-income neighborhoods (https://features.propublica.org/driven-into-debt/chicago-ticket-debt-bankruptcy/). An increase in parking spots was also found to have increased housing costs in these areas, while in New York, over $600 million worth of tickets were "written off".

Research to identify an optimum strategy for enforcement routing has involved studying numerous optimization strategies. Spatio-temporal probabilistic modeling strategies have been incorporated using real-time sensor data to propose solutions to the "Travelling Officer" problem, which aims to obtain maximum citations in a minimum amount of time. There has also been some research introducing game-theory modeling to identify potential interactions between an enforcement officer's decision to patrol an area and corresponding decisions by a driver to pay for parking. While most of these solutions focus on deriving an effective model, there is a noticeable void in addressing how these models may improve an enforcement officer's day-to-day at work. The present inventors consider this to be a foundational direction upon which to build, addressing an evident gap in enforcement routing applications—the ability to view the context for a certain route and complete that route in the shortest time possible with the most citation captures rendered by the assistance of visual aids along the route.

Navigation can involve four primary tasks: initial orienting, maneuvering, orientation maintenance, and target recognition. Varied strategies for effective navigation have been explored over time. Successful navigation can generally involve: beacons and landmarks (to identify location through place markers and configurations), route knowledge (to identify locations through corresponding sequence), graph knowledge (connections of places (nodes) through intersecting paths), survey knowledge (to estimate location through metric measurement), and podiokinetic knowledge (to learn about spatiality through motor movement and muscle contraptions along with visual knowledge).

Key factors that can influence the design of navigation systems, however, are localization and orientation sources and technologies, the varied number and types of output devices, and the level of abstraction created to bridge the gap between the real and virtual worlds. The need for establishing a context can be underscored within a transitional interface—an interaction technique to navigate, change content within a context, or transition between contexts. In addition, context can be defined as an environment where a user can interact and collaborate, and include space (e.g., augmented reality, virtual reality, reality), scale (e.g., macro, micro, nano), representation (e.g., photorealistic, symbolic), viewpoints (e.g., focus, secondary), and embodiment (e.g., proximal, distal).

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for a method and system for enhanced enforcement routing operations facilitated by a mobile device.

It is another aspect of the disclosed embodiments to provide for a method and system of enabling contextual information and immersive insights in the form of an AR navigational aid for use in parking enforcement operations.

It is a further aspect of the disclosed embodiments to provide contextual navigational aids and cues for parking enforcement officers in a mixed reality environment.

The aforementioned aspects and other objectives and advantages can now be achieved as described herein. In an embodiment, a method for parking enforcement, can involve graphically displaying in a GUI (Graphical User Interface), a mixed reality display of data including at least some augmented reality data comprising parking enforcement information and real-time navigational cues for a navigation that account for a current location of a parking enforcement officer and at least one zone allocated to the parking enforcement officer; capturing license plate information to determine compliance with curbside regulations; and integrating at least one payment data source and at least one citation issuance application to issue a citation based on the license plate information.

An embodiment of the method can further involve contextualizing blockface regulations to allow the parking enforcement officer to view regulations regarding a blockface in a line of view or along a navigation route of the parking enforcement officer.

An embodiment of the method can further involve dynamically rerouting to at least one other zone during the navigation when the parking enforcement officer is out of the at least one zone allocated to the parking enforcement officer.

An embodiment of the method can further involve dynamically rerouting to at least one other zone during the navigation to change the at least one zone allocated to the parking enforcement officer while the parking enforcement officer is on duty and to strategically redirect the parking enforcement officer to enforcing routing within at least one new zone.

An embodiment of the method can further involve permitting a manager of the parking enforcement manager to view, assign, and modify the at least one zone allocated to the parking enforcement officer.

In an embodiment, a system for parking enforcement, can include at least one processor and a memory, the memory storing instructions to cause the at least one processor to perform: graphically displaying in a graphical user interface, a mixed reality display of data including at least some augmented reality data comprising parking enforcement information and real-time navigational cues for a navigation that account for a current location of a parking enforcement officer and at least one zone allocated to the parking enforcement officer; capturing license plate information to determine compliance with curbside regulations; and integrating at least one payment data source and at least one citation issuance application to issue a citation based on the license plate information.

In an embodiment of the system, the instructions can further cause the at least one processor to perform: contextualizing blockface regulations to allow the parking enforcement officer to view regulations regarding a blockface in a line of view or along a navigation route of the parking enforcement officer.

In an embodiment of the system, the instructions can further cause the at least one processor to perform: dynamically rerouting to at least one other zone during the navigation when the parking enforcement officer is out of the at least one zone allocated to the parking enforcement officer.

In an embodiment of the system, the instructions can further cause the at least one processor to perform: dynamically rerouting to at least one other zone during the navigation to change the at least one zone allocated to the parking enforcement officer while the parking enforcement officer is on duty and to strategically redirect the parking enforcement officer to enforcing routing within at least one new zone.

In an embodiment of the system, the instructions can further cause the at least one processor to perform: permitting a manager of the parking enforcement manager to view, assign, and modify the at least one zone allocated to the parking enforcement officer.

In an embodiment, a graphical user interface can include a mixed reality display of data including at least some augmented reality data comprising parking enforcement information and real-time navigational cues for a navigation that account for a current location of a parking enforcement officer and at least one zone allocated to the parking enforcement officer, wherein license plate information is captured to determine compliance with curbside regulations, and wherein at least one payment data source and at least one citation issuance application are integrated to issue a citation based on the license plate information.

In an embodiment of the graphical user interface, the blockface regulations can be contextualized to allow the parking enforcement officer to view regulations regarding a blockface in a line of view or along a navigation route of the parking enforcement officer.

In an embodiment of the graphical user interface, dynamically rerouting to at least one other zone can occur during the navigation when the parking enforcement officer is out of the at least one zone allocated to the parking enforcement officer.

In an embodiment of the graphical user interface, dynamically rerouting to at least one other zone can occur during the navigation to change the at least one zone allocated to the parking enforcement officer while the parking enforcement officer is on duty and to strategically redirect the parking enforcement officer to enforcing routing within at least one new zone.

In an embodiment of the graphical user interface, a manager of the parking enforcement manager can be permitted to view, assign, and modify the at least one zone allocated to the parking enforcement officer.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
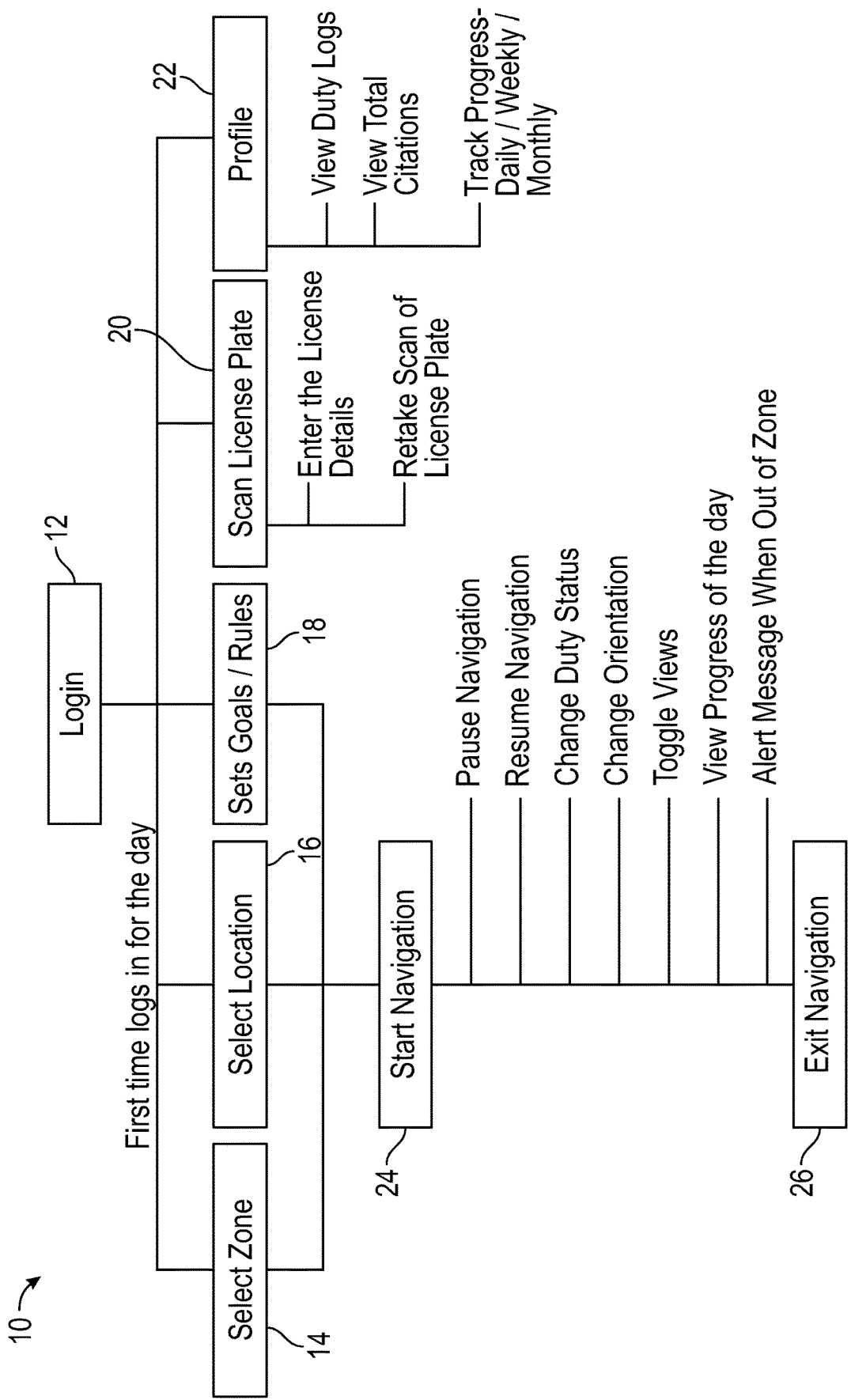
FIG. 1 illustrates a block diagram depicting an officer task architecture, in accordance with an embodiment.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Several aspects of data-processing systems will now be presented with reference to various systems and methods. These systems and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A mobile "app" is an example of such software.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer.

By way of example, and not limitation, such computer-readable media can include read-only memory (ROM) or random-access memory (RAM), electrically erasable programmable ROM (EEPROM), including ROM implemented using a compact disc (CD) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), and floppy disk where disks usually reproduce data magnetically, while discs reproduce data optically with lasers. Combinations of the above should also be included within the scope of computer-readable media.

The disclosed systems, devices, and methods can implement AR (Augmented Reality) environments that can include at least some virtual elements that can replace or augment the physical world. Input devices, such as touch-sensitive surfaces, for computer systems and other electronic computing devices can be used to interact with a virtual/augmented reality environment. Example touch-sensitive surfaces include touchpads, touch-sensitive remote controls, and touch-screen displays. Such surfaces can be used to manipulate user interfaces and objects therein on a display. Example user interface objects include digital images, video, text, icons, and control elements such as buttons and other graphics. The term "AR" or "augmented reality" as utilized herein can relate to the superimposition of a computer-generated image on a user's view of the real world, thereby providing a composite view.

AR can provide for an interactive experience of a real-world environment where the objects that reside in the real world are enhanced by computer-generated perceptual information, sometimes across multiple sensory modalities, including but not limited to visual, auditory, haptic, somatosensory, and olfactory. AR can fulfill three basic features: a combination of real and virtual worlds, real-time interaction, and accurate 3D registration of virtual and real objects. The overlaid sensory information can be constructive (i.e. additive to the natural environment), or destructive (i.e. masking of the natural environment). This experience can be seamlessly interwoven with the physical world such that it is perceived as an immersive aspect of the real environment. In this manner, AR can alter a user's ongoing perception of a real-world environment, whereas virtual reality can completely replace a user's real-world environment with a simulated one. AR is related to mixed reality and computer-mediated reality.

The term "mixed reality" as utilized herein can relate to the merging of real and virtual worlds to produce new environments and visualizations, where physical and digital objects co-exist and interact in real time. Mixed reality may not exclusively take place in either the physical or virtual world, but can be implemented as a hybrid of reality and virtual reality, encompassing both augmented reality and augmented virtuality via immersive technology. AR can include mixed reality environments and virtual reality environments.

One of the goals of the disclosed embodiments, given a plethora of curbside data, is to enhance PEO information by seeking and sharing a process with an intuitive mixed reality solution that can integrate virtual insights with real-time sights. The disclosed mixed reality approach can enhance routing and scoring algorithms by providing enforcement personnel with real-time recommendations to improve productivity and efficiency. Using real-time GIS coordinates and AR displays, enforcement personnel will be able to read license plates to determine compliance with curbside regulations, integrating with payment data sources and citation issuance applications. This solution can provide guidance to enforcement personnel as they move about their assigned zones. The disclosed embodiments thus provide for immersive display and design techniques including systems and methods thereof, which attempt to bridge this missing gap between the real and virtual information seeking patterns and features key Immersive Insights—Contextualization of Blockface Regulations, Dynamic Zone Rerouting During Navigation and Aggregation of Vehicle Insights, as discussed in greater detail herein.

FIG. 1 illustrates a block diagram depicting an officer task architecture 10, in accordance with an embodiment. Note that the term "architecture" as utilized herein relates to a system architecture or systems architecture, which is a conceptual model that can define the structure, behavior, and more views of a system. An architecture description is a formal description and representation of a system, organized in a way that supports reasoning about the structures and behaviors of the system. The officer task architecture 10 shown in FIG. 1 can be implemented based on a user persona or a group of such personas.

A persona can be derived through an analysis of an extensive set of qualitative data from secondary research, literature review and observations. Such personas can be then situated in scenarios to visualize information related problems in the practice. Based on the temporal structure (e.g., when does the officer react to something happening) two possible user personas can be implemented, as discussed below: a proactive law enforcement officer and a reactive law officer.

An example of a proactive law enforcement officer can be understood by way of an example. John Doe, for example, is 32 years old, and is an amiable guy who is ambitious in whatever he does and has been working as an officer for 8 years. Mr. Doe always strives to do his best in his job and really enjoys his work. He is tech-savvy and is always impressed by the new technologies coming into practice and thinks old systems should be updated frequently. He is patient and believes that working with other officers enables him to resolve queries faster and perform better. Since he is one of the top performers, he has multiple patrolling or enforcement zones, which are assigned to him. He maintains a portable record of all the actions he has taken for a day and areas where each action was taken, so that he can stop any future violations to occur in that area.

Some of Mr. Doe's goals may include trying to achieve set goals for the day and sometimes he achieves more. Mr. Doe has found a workaround with the existing static map, and has made optimized rules for himself. Mr. Doe's aim of the day may be to minimize as many violations as possible (i.e. issue citations). He may wish to traverse whole zone assigned in a minimum time. He also wishes to help citizens in need and may attempt to caters to their needs.

Mr. Doe's "pain-points" include forgetting to keep track of his duty status most of the time. Even though he is very friendly in dealing with the citizens, some citizens have complained that he can speak aggressively. In addition, prioritizing zones is difficult for Mr. Doe at times. He may also be unaware of any constraints ahead in the day (e.g., accidents of any sort or weather). Mr. Doe is thus an example of a proactive law enforcement officer.

An example of a reactive law enforcement officer is Dan, a 45 years old officer who has been working since he was 20 years old. Dan is has a short-tempered personality, but may also be considered as "laid back". Dan has a tendency to do just enough to keep out of trouble while successfully avoiding taking on more work than necessary; but, he has the most experience in patrolling. When involved in an emergency situation, Dan is usually not the first officer approached; however, if a mandatory action must be taken, he may take the necessary actions to solve the issue. Not very keen to change, he prefers the "old school" methods of law enforcement and tries to keep up with the new technology when there is a dire need to do so. He also has little patience when dealing with people.

Dan's goals are to try to achieve exactly what is asked of him. His aim of the day is to minimize the time taken to engage in a patrol. He also wants to avoid any situation where he has to deal with citizens. In addition, he uses his own navigation understanding to patrol in a zone.

Dan's "pain-points" are that he is basically too lazy to track the duty status, and at times becomes embroiled in a spat with citizens. He also little or no motivation to achieve his goals and becomes easily irritated with the static map and refuses to use it. Most often, he strays away from his enforcement zone.

Based on the above goals and pain-points of the above example personas, the following example feature list was finalized:

Help officers set his own goals giving him the bar of the minimum requirement.
Ability to choose a zone for enforcement before and during navigation
Filter to show minimum path in terms of distance and time taken to traverse.
Easy understanding of the navigational maps and high priority zones.
Automatic update of the duty status once the navigation is on.
Gamification/Points translating into overall performance board.
Incentives based on the performance.
Maps adaptable to the users with search and filter options.
Notification or alert message when officer goes off the radius of the zone set by him.
Points for achieving more than the required goals.
Rules can be modified accordingly by officers.
Filter the areas of the zones based on future occurrence of violation based on the time of the day and the distance.
Reminder to change the duty status based on the activity levels in the navigation map.
Option to prioritize by applying the probability of the citations based on the time of the day.
Recurring constraints can be shown upfront based on the day and time of the week.

Out of this intensive list of features, the following information architecture of an application to be used by the enforcement officer can be designed based on the feasibility, priority and time-constraints. The major tasks to be performed by the officers can include the following:

View and Select the zones and their priority and choose their start location.
Set their daily goals and rules based on their own requirement and their manager's goals set for them.
Navigate their zones in the set direction shown in AR mode or map mode.
Track their own progress on a daily, weekly and monthly basis.
View their duty logs and total citations issued by them.
Scan the vehicle license plate and record the information.
View the block face information in their zones and learn about the restrictions on certain areas based on time of the day.

The officer task architecture 10 shown in FIG. 1 provides for a login feature 12. Note that the term login as utilized herein can relate to the act of logging in to a database, mobile device, computer, or other type of data-processing system or apparatus, especially a multiuser computer or a remote or networked computer system. The term login can also involve a set of credentials used to authenticate a user. Most often, these credentials can include a username and password. However, a login may include other information, such as a PIN number, passcode, passphrase, etc. Some logins require a biometric identifier, such as a fingerprint or retina scan.

When a user logins in for the first time for the day, the user is presented with a feature 14 that allows the user to select a zone and a feature 16 that allows the user select a location. The user can also be presented with a feature 18 that allows the user to set goals and/or rules, and a feature 20 that permits the user to scan a license plate. Feature 20 can allow the user to enter license plate details and to retake (rescan) the license plate if desired. In addition, the user can be presented with a feature 22 that allows the user to view profile information including the viewing of duty logs, total citations, and to track progress (e.g., daily, weekly, monthly, etc).

Following processing of feature 14, feature 16, and/or feature 18, the user can be presented with a feature 24 that allows the user to initiate navigation. Feature 18 can also allow the user to pause navigation, resume navigation, change the duty status, change the orientation, toggle views, view progress for the day, and provide alerts when the user is out of the selected zone. The user can also be presented with a feature 26 that allows the user to exit the navigation.

Figure 2:
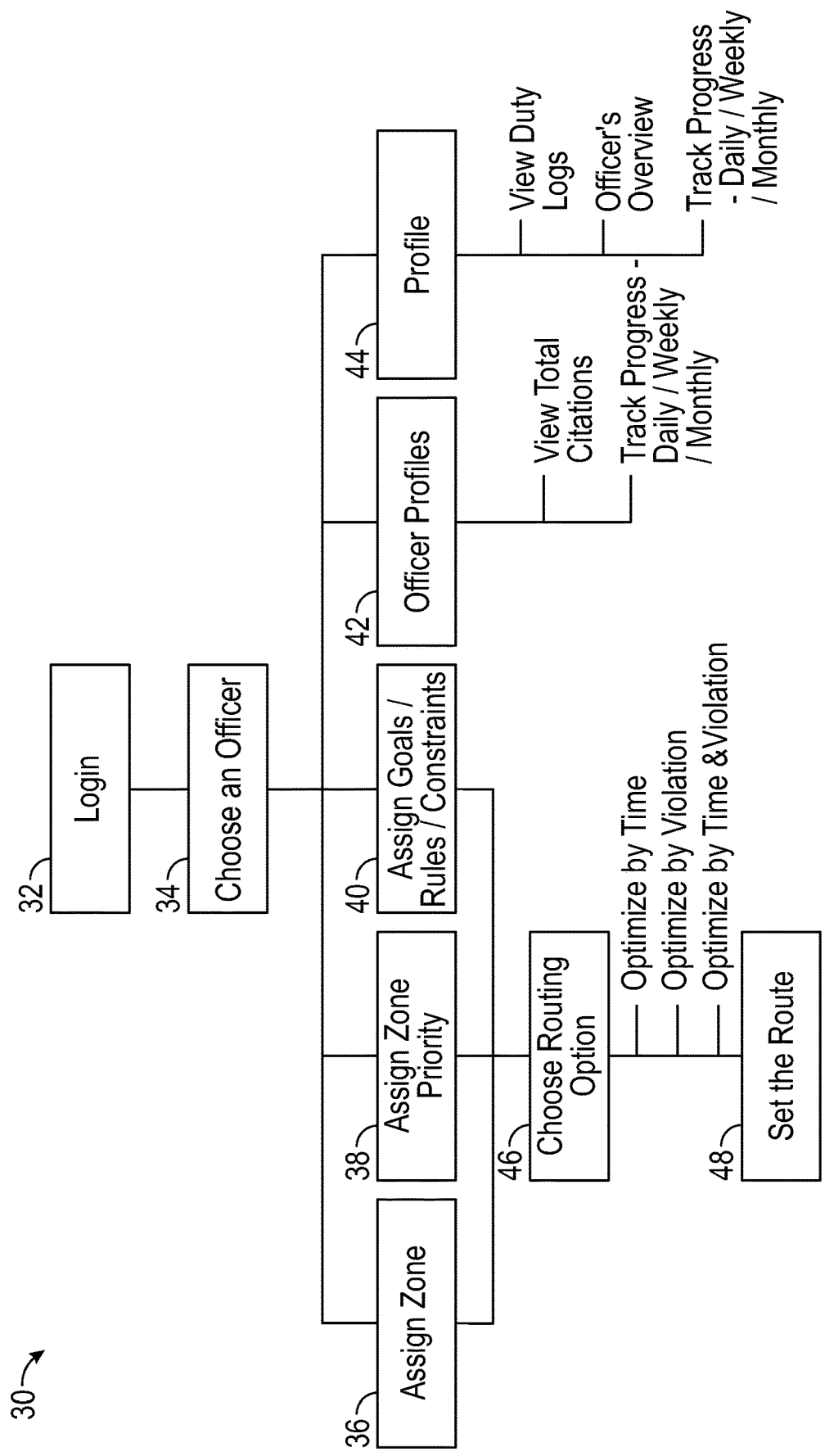
FIG. 2 illustrates a block diagram depicting a manager task architecture, in accordance with an embodiment.

FIG. 2 illustrates a block diagram depicting a manager task architecture 30, in accordance with an embodiment. The solution described above with respect to FIG. 1 for enforcement managers can cater to their pain-points and goals but can also include or function in tandem with a supporting enhancement for their managers, which can facilitate improved managing of these officers so that both parties work together do improve their jobs. FIG. 2 thus depicts such an enhancement.

Thus, the manager task architecture 30 shown in FIG. 2 can provide a login feature 32 that a user (in this case, a manager) can access to login. In addition, a feature 34 can be provided, which allows the manager to select an officer. Additional features include a feature 36 that allows a manager to assign a zone to an officer, and a feature 38 that allows the manager to assign a zone priority. A feature 40 also allows the manager to assign goals, roles and/or constraints. The manager can also access a feature 42 that allows the manager to view offer profiles including viewing total citations issued by a given officer, and track the progress (e.g., daily, weekly, monthly, etc.) of the officer. The manager can also be provided with a feature 34 that allows the officer to view other profile information. Feature 34 can permit the manager to view daily logs, an officer's overview, and to track progress (e.g., daily, weekly, monthly, etc.).

The manager task architecture 30 also includes a feature 46 that allow the manager to chose a routing option including the ability to optimize routing by time and/or violation. In addition, a feature 48 allows the manager to set the route.

Thus, examples of major tasks performed by a manager can include managing the enforcement office assigned under him or her, and assigning zones and their priorities to each officer. In addition, the manager task architecture 30 allows the manager to selecting routing options for an officer optimized by time, violations, return-on-investment, or a mixture of these options. The manager task architecture 30 can also provide for the selection of random routing options, which can be accessed from time to time to test the optimization criteria, and to track performance progress for both the manager and officers on a daily, weekly and monthly basis.

Figure 3:
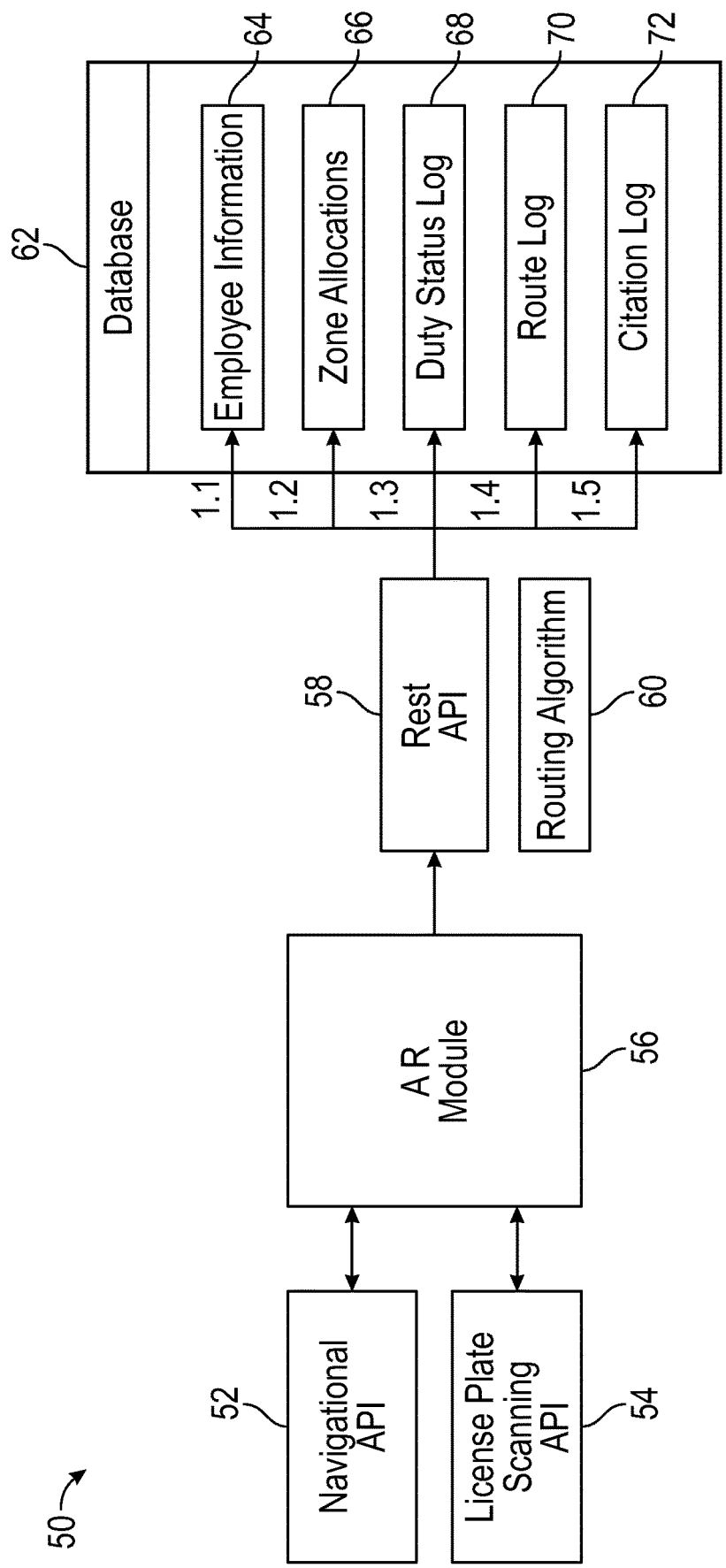
FIG. 3 illustrates a block diagram of a system for enabling immersive navigation for parking enforcement routing, in accordance with an embodiment.

FIG. 3 illustrates a block diagram of a system 50 for enabling immersive navigation for parking enforcement routing, in accordance with an embodiment. The system 50 can include an AR (Augmented Reality) module 56 that communicates bidirectionally with a navigational API (Application Programming Interface) 52 and a license plate scanning API 54. The AR module 56 can output data that can be input to a REST API 58 associated with or which includes a routing algorithm 60. Output from the REST API 58 can be provided to a database 62 that can store or maintain employee information 64, zone allocations 66, a duty status log 68, a route log 70, and a citation log 72.

System 50 can thus enable enforcement routing through a number of elements or features. The AR module 56, which can also be referred to as a "RoutAR Solution", constitutes the core AR mobile application that can enable access primarily for two types of users: enforcement officers and enforcement managers. Enforcement officers can view assigned zones and priorities, and can initiate navigating from their current location or from a location of choice. On initiating a navigation, the enforcement officer can be routed to that zone, and then, within the zone, can be provided with instructions about the direction to take to increase the probability of finding infractions. The enforcement officer can also view block regulations and subsequently issue citations by effortlessly scanning license plate information. The enforcement manager can view assigned lists of officers and assigned zones and zonal priorities for each officer. The enforcement officer can also add new officers to manage.

The navigational API 52 can be implemented as a pluggable pre-existing module that can render a map view and provide directional instructions for a given route within the AR view. The navigational API 52 can be integrated with the AR module 56, and solutions such as (but not limited to) Google Maps API and Mapbox.

The license plate scanning API 54 can be implemented as a pre-existing module that detects license numbers from images of scanned license plates and provides additional context about the vehicle such as the vehicle's the make and model. In-house Automatic License Plate Recognition (ALPR) solutions or commercially available solutions such as OpenALPR can be used to implement the license plate scanning API 54.

The database 62 can be implemented as a central repository for all information accessed and generated by the AR module 56. Database 62 can include data tables that include the employee information 62 (e.g., information regarding login credentials, user ID's, names, roles, managers, etc.), zone allocations 66 (e.g., a log of zones and corresponding priorities that cab be allocated to an officer, either by a manager or by the officer themselves), the duty status log 66 (e.g., the status of the enforcement officer which involve one of the following choices: On Duty—signifies the officer starting navigation on the job; Pause—signifies the officer taking an official break from navigation; and Off Duty—signifies the ending of their navigation session), the route log 70 (e.g., once the officer successfully completes navigation, a log of their route, distance travelled, time travelled, and number of citations issued in the session are stored in this data table), and the citation log 72 (e.g., when an officer scans a license plate and decides to issue a citation, the citation information about the license plate number, violation coordinates, vehicle make and model, and presence on the boot, scofflaw, stolen, and amber alert lists can be captured and stored in this data table).

The REST API 58 can be implemented as a module that powers the AR module 56 and can serve as a primary source of information for the AR module 56. The REST API 68 can provide a number of functions through a combination of scripts and interactions with the database. For example, the REST API 58 can validate a user login (e.g., verify user login credentials and provides insights about the user name and role, e.g., whether the user is a manager or officer) based on the employee information 64. The REST API 58 can also assist in allowing the user to view an officer's allocated zones. That is, the REST API 58 can allow an officer who has logged in to view the list of zones, boundaries, and priorities that are assigned to them, based on the zone allocations 66. The REST API 58 can further allow a user to view the list of officers and their most recently assigned zones, based on the zone allocations 66. In addition, the REST API 58 can allow a manager to add or modify zone allocations for an officer based on the zone allocations 66. The REST API 58 can further permit the user (e.g., manager) to view available and assigned zones based on the zone allocations 66. That is, the REST API 58 can enable a manager to view, which of the zones have been allocated and which are still available for allocation to an officer, again based on the zone allocations 66.

The REST API 58 can also allow for the retrieval of vehicle details. That is, the REST API 58 can be operable to allow an enforcement officer to view information indicating, for example, whether a vehicle is boot eligible, scofflaw eligible, is a stolen vehicle, is associated with an Amber alert, and whether its parking has been paid for, and if so, how long a time period may have been exceeded. The REST API 58 can further allow the user to obtain the zonal route. Moreover, the REST API 58 can operate in associate with the routing algorithm 60 to retrieve an optimized route for traversing a zone given a current location, and select a zone, a day of the week and hour of the day. The REST API 58 can further facilitate retrieving block level regulations that can aid in information comprehension (as processed by the routing algorithm 60).

The REST API 58 can also update the duty status. For example, upon starting, pausing and exiting a navigation, the duty status of an officer can be updated as "On Duty", "Pause", and "Off Duty" through this endpoint, and this information can be saved in the duty status log 68. The REST API 58 can further facilitate capturing a citation. That is, when an officer identifies a violation and decides to issue a citation, then the information about the vehicle, including the location of issuance can be captured and stored in the duty status log 68. The REST API58 can further facilitate storing a session log. For example, when an officer completes his navigation session, the route travelled, distance travelled, zones covered, time of travel, and number of citations captured can be received and stored in the route log 70.

Figure 4:
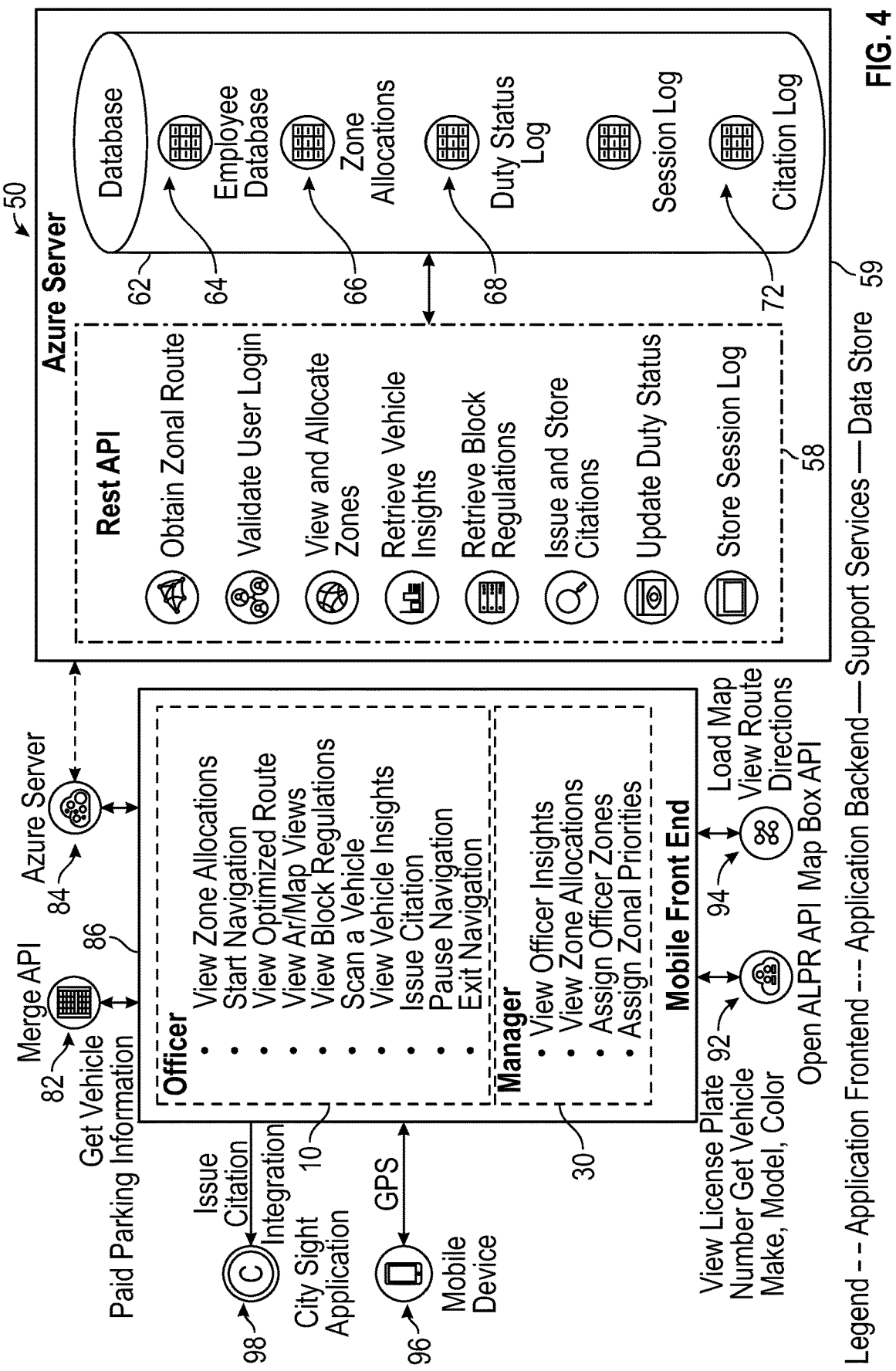
FIG. 4 illustrates a block diagram of a system for parking enforcement, in accordance with an embodiment.

FIG. 4 illustrates a block diagram of the system 50 for parking enforcement, in accordance with an embodiment. The system 50 shown in FIG. 4 is an alternative version of the system 50 shown in FIG. 3. Note that as utilized herein, identical or similar parts or elements are generally indicated by identical reference numerals. Thus, the system 50 shown in FIG. 4 can include the database 62 and the REST API 58.

A server 59 can maintain and operate the REST API 58 and the database 62. The server 59 may be implemented as, for example, an Azure server, which is a cloud computing service created by Microsoft for building, testing, deploying, and managing applications and services through Microsoft-managed data centers. An Azure server can provide software as a service (SaaS), platform as a service (PaaS) and infrastructure as a service (IaaS) and can support many different programming languages, tools and frameworks, including both Microsoft-specific and third-party software and systems. It should be appreciated that the disclosed embodiments are not limited to the use of an Azure server and that other types of servers may be utilized in place of an Azure server. Reference to the Azure server herein is thus for illustrative and exemplary purposed only and is not considered a limiting feature of the disclosed embodiments.

The server 59 can communicate bidirectionally with another server 84 (which may also be an Azure server), which in turn can communicate bidirectionally with a mobile front end 86 that can support or implement the officer task architecture 10 and the manager task architecture 30. The mobile front end 86 can communicate bidirectionally with a merge API 82. That is, data concerning vehicle paid parking information can be exchanged between the merge AIP 82 and the mobile front end 86. The mobile front end 86 can further provide data, which can be input to a mobile application 98 (e.g., CitySight Application). GPS data can also be exchanged between the mobile front end 86 and a mobile device 96 (e.g., a smartphone, tablet computing device, etc).

In addition, an OpenALPR API 92 can communicate bidirectionally with the mobile front end 86 to facilitate viewing of a license plate number and obtaining a vehicle's make, model, color, etc. A MapBox API 94 can further communicate bidirectionally with the mobile front end 86 to facilitate loading of a map and viewing route directions.

Core competencies for system 50 thus can involve enforcement routing navigation, views and context, and vehicle information retrieval. Regarding enforcement routing navigation, a PEO can navigate from his or her current location to an zone allocated in the most optimal route accounting for historical citation probabilities, time, day of the week, as well as goals, rules, and constraints assigned by him or her or their manager. Along each intersection, the PEO can view a highlighted overlay along each potential direction as well as the potential points that they can accrue along each possible direction. When they walk along a route with blocks, for example, information about each block can be highlighted. This information can tie in to each block's historical citation trends and current probabilities, as well as regulations associated with the block.

Regarding views and context, the AR module 56 can provide both a map view and an AR view with the ability to switch the type and orientation of view. While an extended use of the map view can provide more context to users who are experiencing temporary concerns with the AR view, this may not serve as a complete replacement to the AR view, which can provide contextual elements through visual aids. The AR module 56 can also supports manager tasks within the purview of assigning enforcement zones and performance metrics. However, the manager flow may not engage in any AR components and can be implemented in place to improve operational effectiveness.

Regarding vehicle information retrieval, the PEO can scan a license plate to extract license plate information. This approach can utilize existing data and APIs to provide an integrated view of the vehicle and its compliance with regulations. The application may not account for the filling out of vehicle information by the PEO as this is an existing offering. Instead, the information gathered from multiple sources can be utilized to synthesize information and packaged up as a data point to be integrated with the CitySight application 98 (also referred to simply as "CitySight").

The system 50 can implement several interaction methods, including the contextualization of blockface regulations, dynamic zone rerouting during navigation, and aggregation of vehicle insights.

FIG. 5 to FIG. 22 illustrate various GUI screens of a mobile application or "app" that can be utilized to implement the system 50 or at least portions of the system 50. Note that the term "app" is an abbreviation for an "application" and can relate to piece of software that can run through a web browser or offline on a computer and/or on a mobile device such as the mobile device 98 shown in FIG. 4 or other data processing systems and devices, including so-called "smart" televisions and smart watches. An "app" may or may not have a connection to the Internet.

Figure 5:
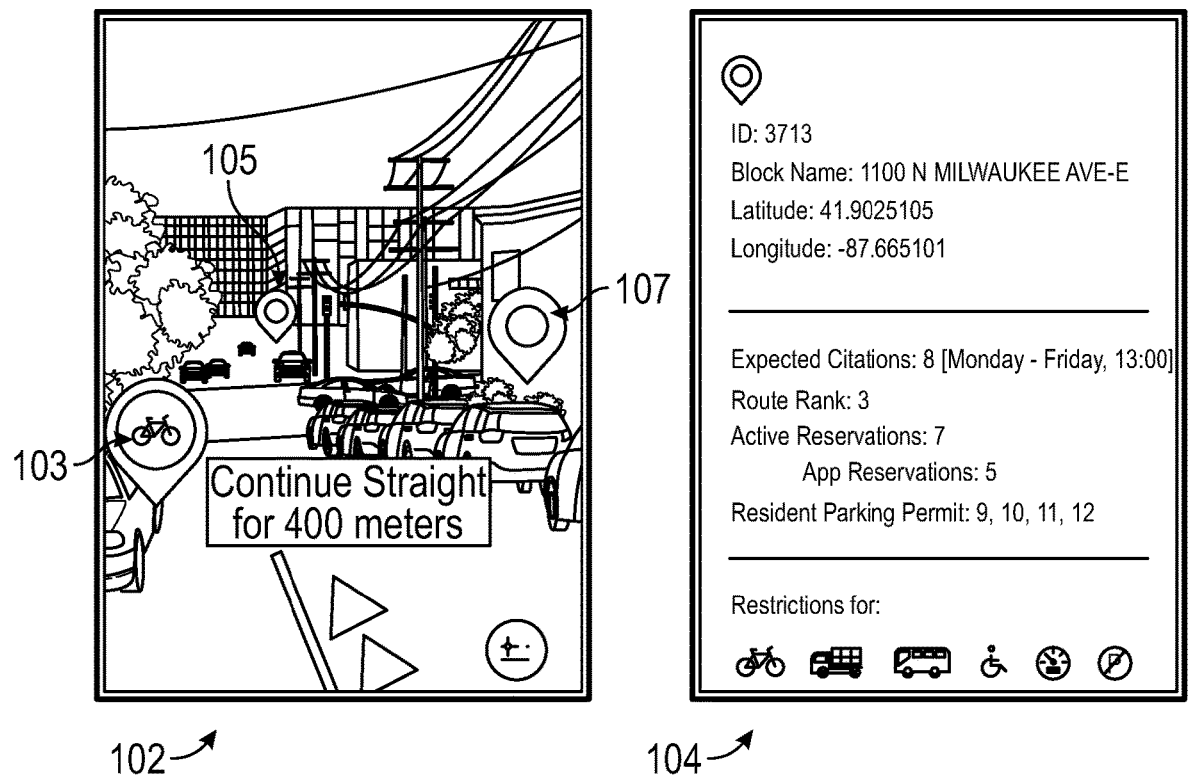
FIG. 5 illustrates images of GUI screens that provides for the contextualization of blockface regulations, in accordance with an embodiment.
Figure 5:
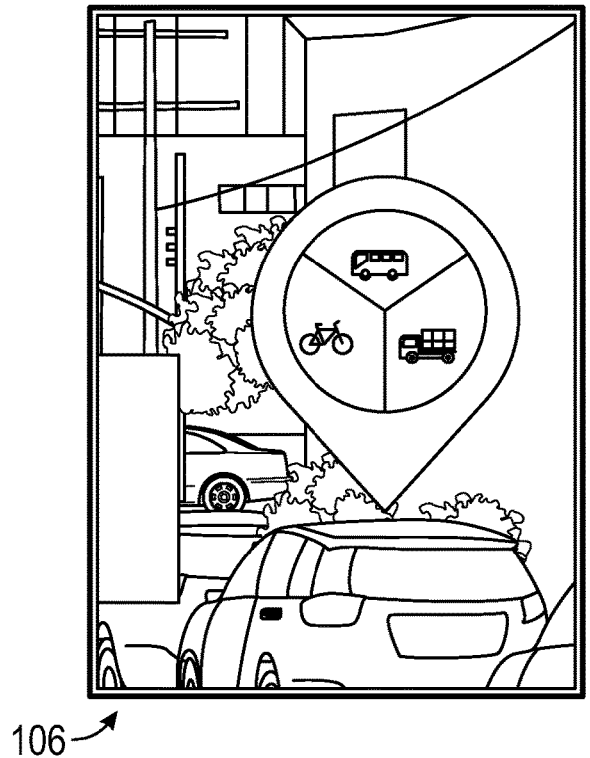

FIG. 5 illustrates images of a GUI screen 102, a GUI screen 104, and a GUI screen 106 that can provide for the contextualization of blockface regulations, in accordance with an embodiment. Through contextualization of blockface regulations, enforcement officers can efficiently view the regulations on each blockface during navigation in their specified zones. For example, the GUI screen 102 displays a marker pin 103, a marker pin 105, and a marker pin 107 overlaid on the displayed image (or video). In response to the selection of a marker pin, another screen such as GUI screen 104 can be displayed, which includes additional information. For example, the regulation information can be displayed in a marker pin, which can serve as a quick decision-making aid to the officers. For more detail-on-demand, the marker pin can be expanded to a new screen with the detailed information on the block-face for better decision-making as shown in GUI screen 106.

Figure 6:
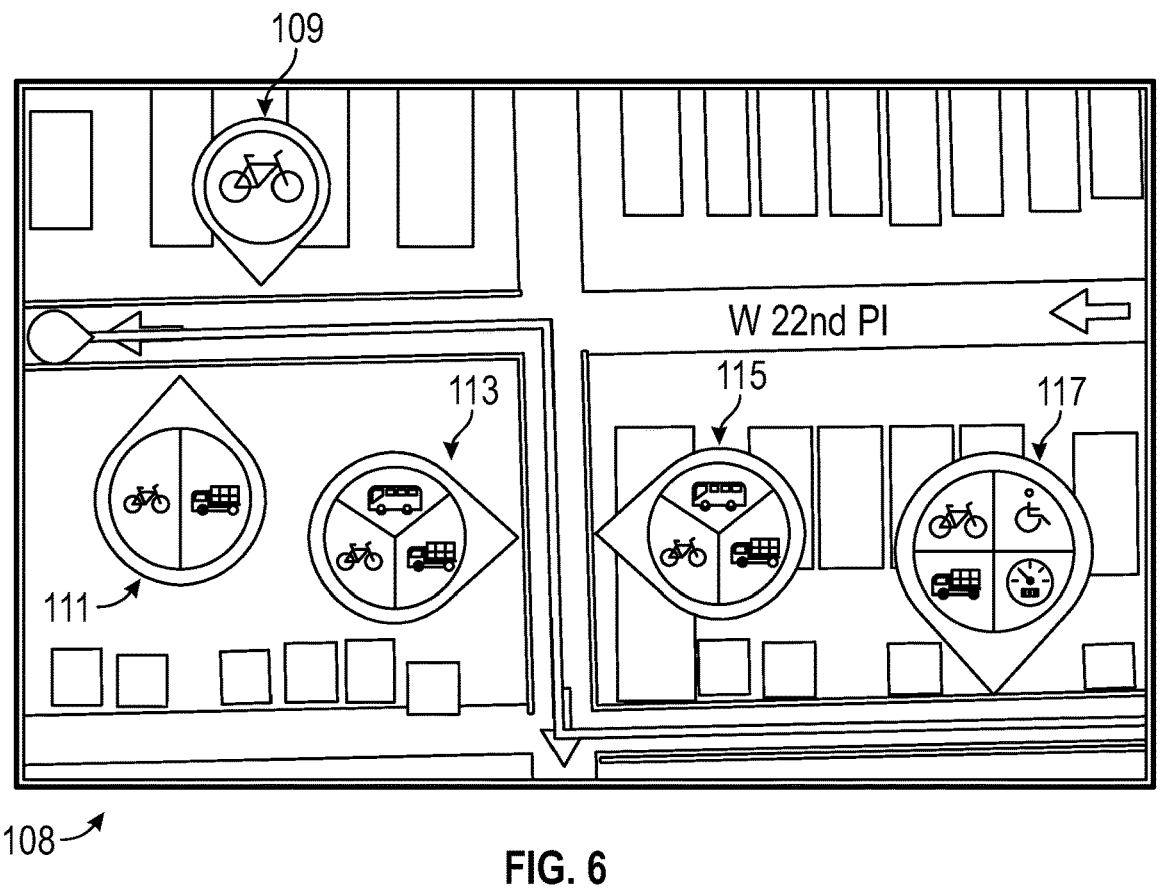
FIG. 6 illustrates images of GUI screens that facilitate the display of a map view providing a global blockface insight gather capability, in accordance with an embodiment.

FIG. 6 illustrates images of a GUI screen 108 that can display a map view providing a global blockface insight gather capability, in accordance with an embodiment. In FIG. 6, a marker 109, a marker 111, a marker 113, a marker 115, and a marker 117 can be displayed in a map view in GUI screen 108. A split view of the marker can be showcased to contextualize multiple regulations in the same asset. The AR view shown in GUI screens 102 and 106 in FIG. 5 can provide blockface markers for the blocks that are both close by and distanced from the PEO, and this can enable the PEOP to make a decision about whether there is a need to walk to a distant block or not. In contrast, the map view shown in GUI screen 108 in FIG. 6 can provide a global blockface insight gathering capability, where officers can view and anticipate regulation information further along the route, without needing to view blocks that are in their immediate line of view. Such features can help officers anticipate what kind of violations to look for well ahead of time.

Figure 7:
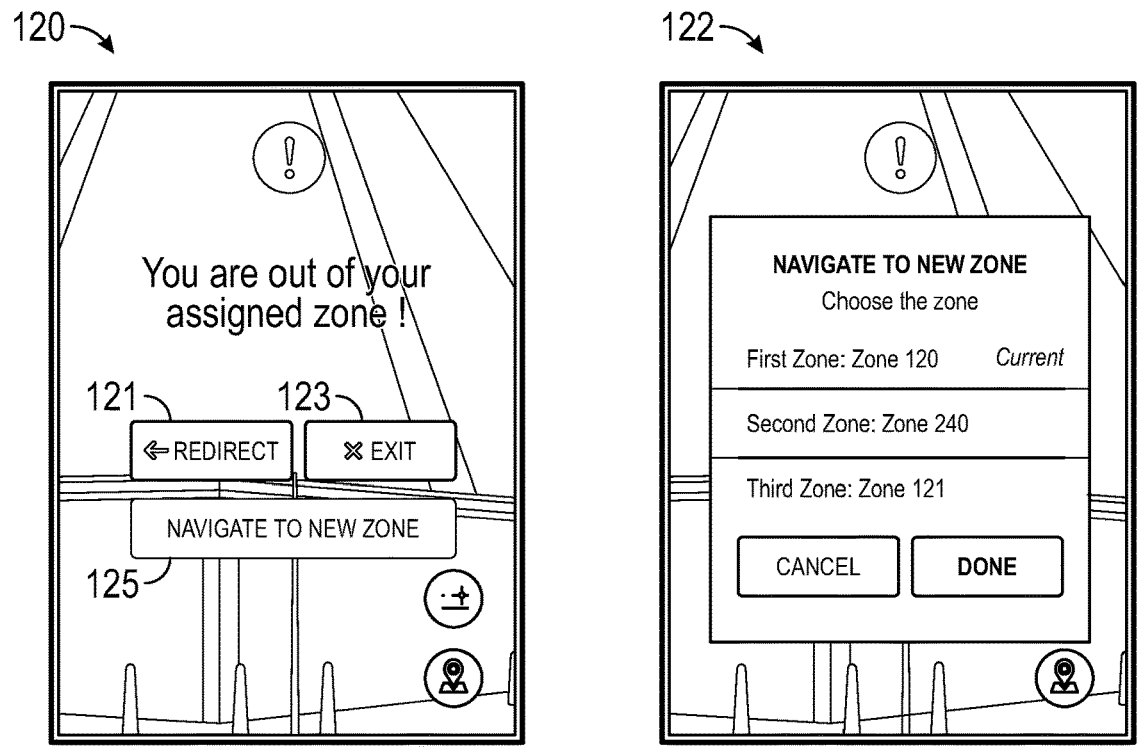
FIG. 7 illustrates images of GUI screens that facilitate dynamic zone rerouting during navigation, in accordance with an embodiment.

FIG. 7 illustrates images of a GUI screen 120 and a GUI screen 122 that can facilitate dynamic zone rerouting during navigation, in accordance with an embodiment. In the GUI screen 120, for example, a message can be displayed for a user indicating that the user is out of his or her assigned zones. A graphical button 121 can be selected to redirect the user to a different zone. A graphical button 123 can be selected to exit the current screen. A graphical button 125 can be selected to navigate to a new zone.

Dynamic zone rerouting during navigation is thus an interaction method that allows the enforcement officer to easily be routed to a new zone during navigation. As officers begin to cross the boundary of their specified zone, they can be provided with an option to be redirected back to the zone or navigate to a new zone. Once out of zone, officers can also have the flexibility to exit the application (i.e. by selecting button 123) to indicate the completion of their duty. Specific zones can be selected and navigated to as shown in GUI screen 122. These interaction methods can reduce the cognitive overload on the PEO, ensuring that his or her actions and intentions can be accounted for, and this can enable them to make decisions on the fly.

Figure 8:
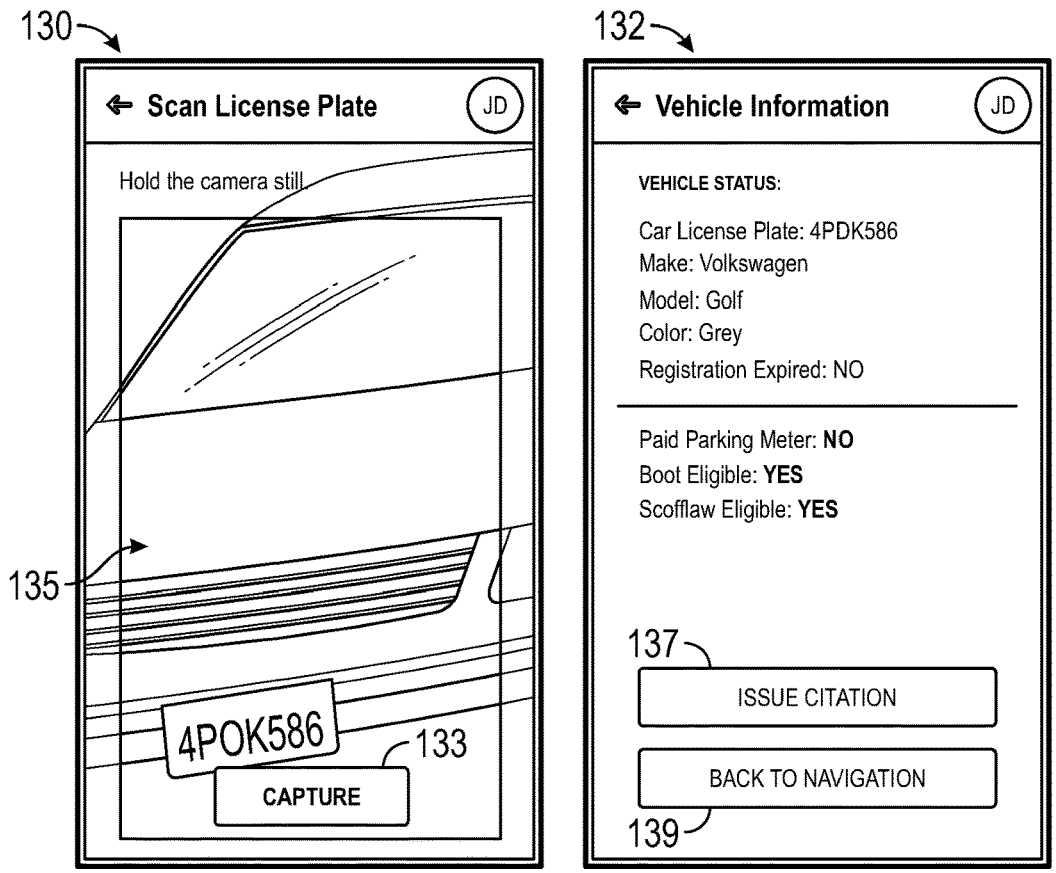
FIG. 8 illustrates images of GUI screens that allows a parking enforcement officer to scan a license plate of any vehicle and view all existing vehicle information that can be assimilated from multiple sources, in accordance with an embodiment.

FIG. 8 illustrates images of a GUI screen 130 and a GUI screen 132 that can allow a parking enforcement officer to scan a license plate of any vehicle and view all existing vehicle information that can be assimilated from multiple sources, in accordance with an embodiment. GUI screen 130 can display an image 135 (or video) of a vehicle with a vehicle license plate and can also display a graphical button 133. When a user selects the graphical button 133, the vehicle license plate shown in the image 135 can be captured via an ALPR module such as the previously discussed OpenALPR API 92 shown in FIG. 4. Specific information associated with the captured vehicle license plate can be displayed in the GUI screen 132. A graphical button 137 can be displayed in GUI screen 132, which when accessed by a user, can result in the issuance of a citation with respect to the vehicle shown in the image 135. A graphical button 139 when selected by the user, can allow the user to return to the navigation.

The GUI screen 130 and the GUI screen 132 shown in FIG. 8 can thus implement the previously mentioned method of aggregation of vehicle insights. Using this interaction method, the enforcement officer can scan the license plate of any vehicle with a single "click" of the graphical button 133 to view all existing vehicle information that can be assimilated from multiple sources. Instead of manually entering this information or querying an alternative database for information, the PEO can view the vehicle plate number, make, model, color and registration validation in the GUI screen 132.

In addition, the PEO can also view whether this vehicle has paid for parking. Information around whether the vehicle is boot eligible, scofflaw eligible, is associated with an Amber alert or is stolen is also aggregated to reduce the time needed for information seeking and decision-making for citation issuance. To account for and issue citation in case of any violation, the officer can directly sync with the previously mentioned CitySight application where the information captured on the screen can be populated automatically to issue the final citation.

Figure 9:
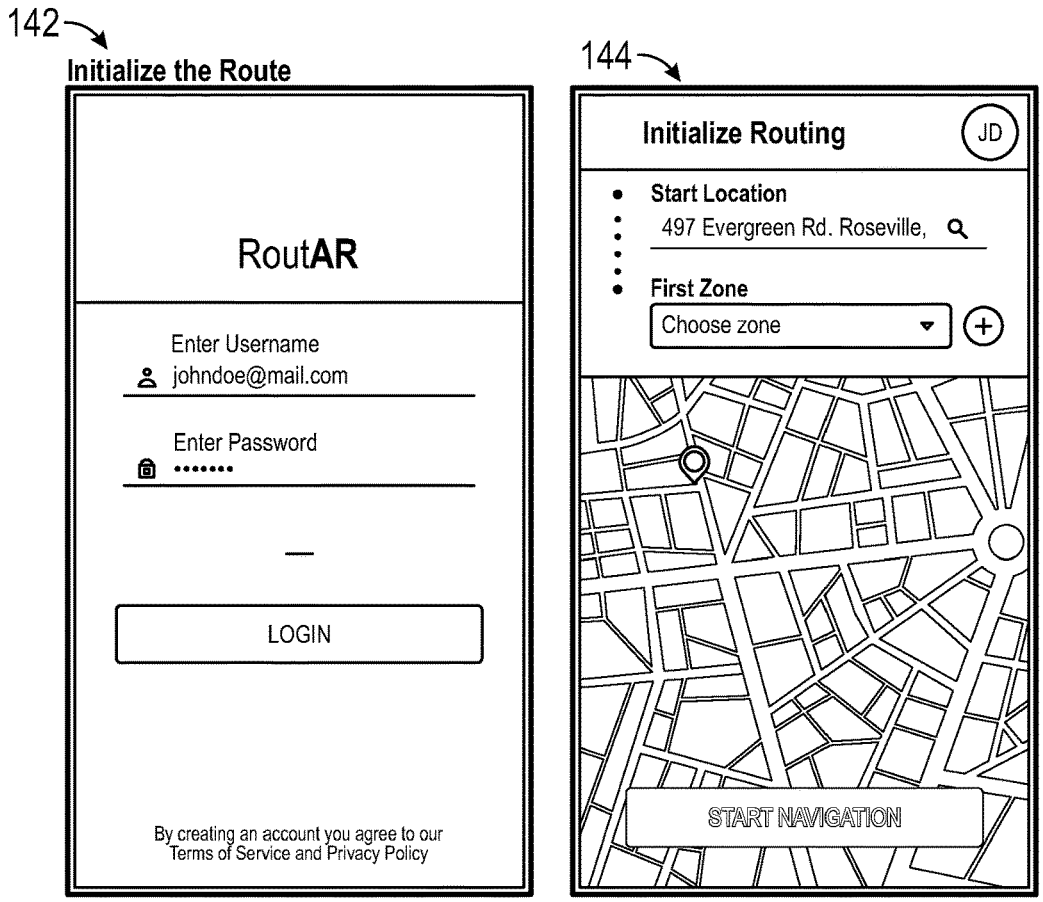
FIG. 9 illustrates images of GUI screens that an enforcement office can access by logging in and initializing routing for a period of time, in accordance with an embodiment.

FIG. 9 illustrates images of a GUI screen 142 and a GUI screen 144 that an enforcement office can access by logging in and initializing routing for a period of time, in accordance with an embodiment. The GUI screen 142 displays a login area for entering username and password information and a login button 142. The GUI screen 144 displays data for initial routing (e.g., start location, first zone, etc). The interactions within the system 50 can be optimized for a conventional mobile phone display, but the overarching solution can be utilized by and repurposed for an HMD (Head Mounted Display) as well.

Major tasks, which may be required to be carried out by any enforcement officer accessing this application can include initializing their route for the day (or a session), navigating the route either in an AR mode or a map mode, viewing block level regulations and insights, scanning the license plate of a vehicle, viewing vehicle information to enable citation issuance, and collecting and enabling the transfer of data for issuing a citation.

Figure 10:
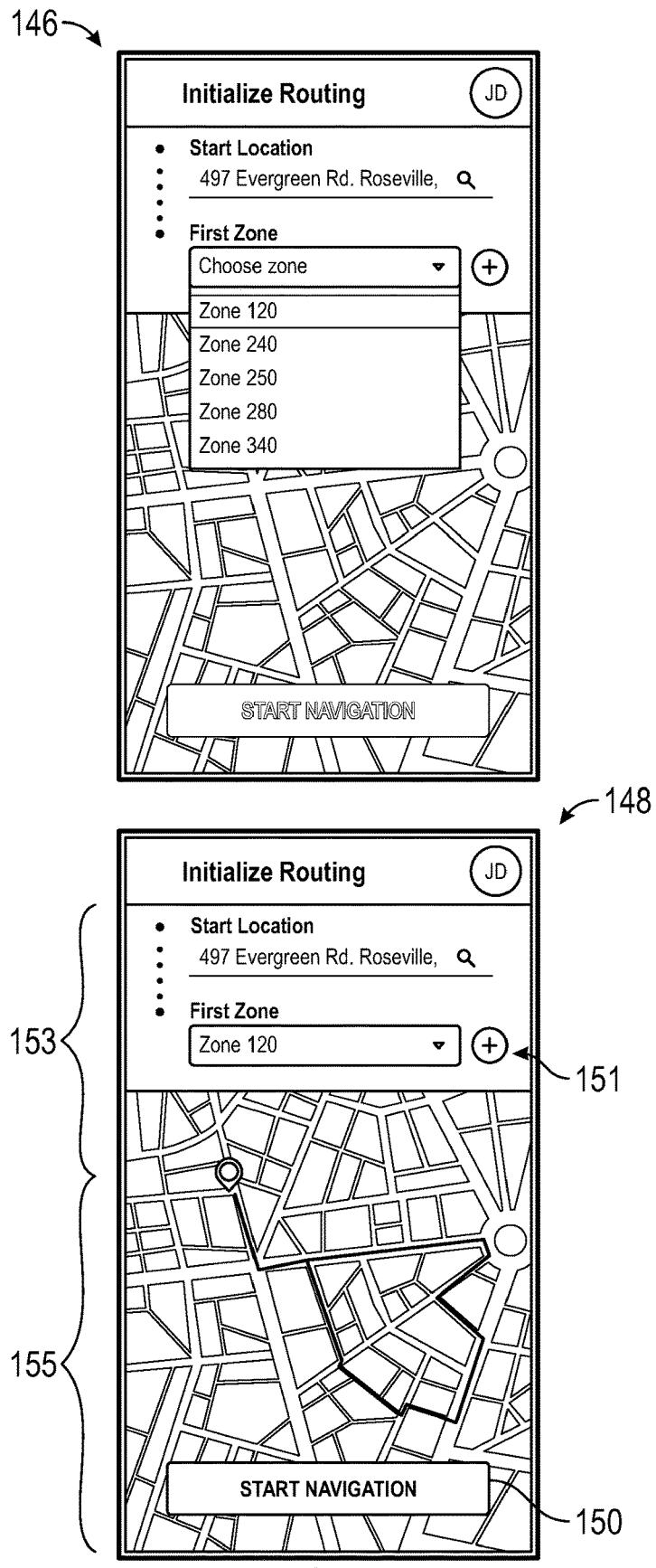
FIG. 10 illustrates images of GUI screens that allow a parking enforcement officer to select a zone from a dropdown listing containing already available zones for the parking enforcement office, in accordance with an embodiment.

FIG. 10 illustrates images of a GUI screen 146 and a GUI screen 148 that can allow a parking enforcement officer to select a zone from a dropdown listing containing already available zones for the parking enforcement office, in accordance with an embodiment. An enforcement officer can be required to access this application by logging in first (e.g., see GUI screen 142 shown in FIG. 9) and initializing the routing for the day (e.g., see GUI screen 144 in FIG. 9). The routing screen has a start location where the officer can be required to update his or her location, and this can be accomplished either automatically or by searching manually. Once that is done, the officer can be required to choose their first zone from a dropdown list containing already available zones for the officer as shown in GUI screen 146. The GUI screen 148 includes a start navigation button 150 for initial routing.

Once the first zone field is populated, as shown in GUI screen 146, the Start Navigation button 150 as well as the add symbol 151 can be selected. An officer can add up to three zones in a given session for the day. The GUI can be divided in two where a first half 153 shows the input fields and a second half 155 displays a map view. The zone, which gets selected by the officer, can also be shown geographically so that the user obtains an estimation of the area size as well the distance from his or her start location which can be marked as a pin.

Figure 11:
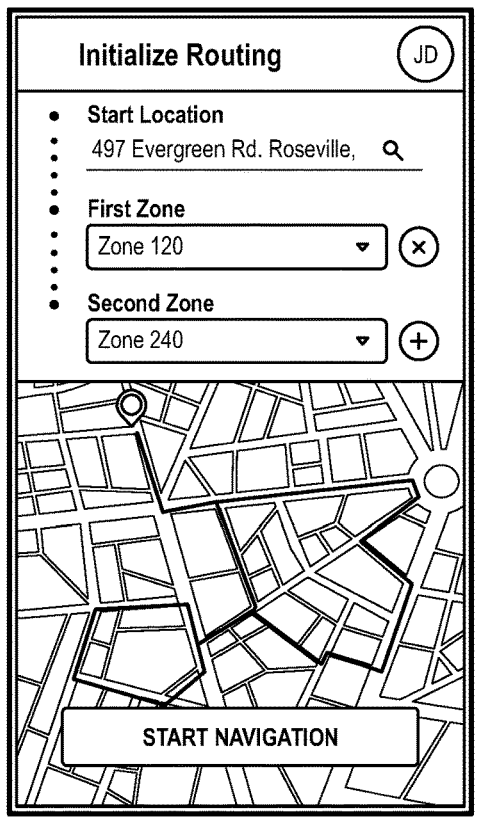
FIG. 11 illustrates images of GUI screens that allow a parking enforcement officer to initialize routing, in accordance with an embodiment.
Figure 11:
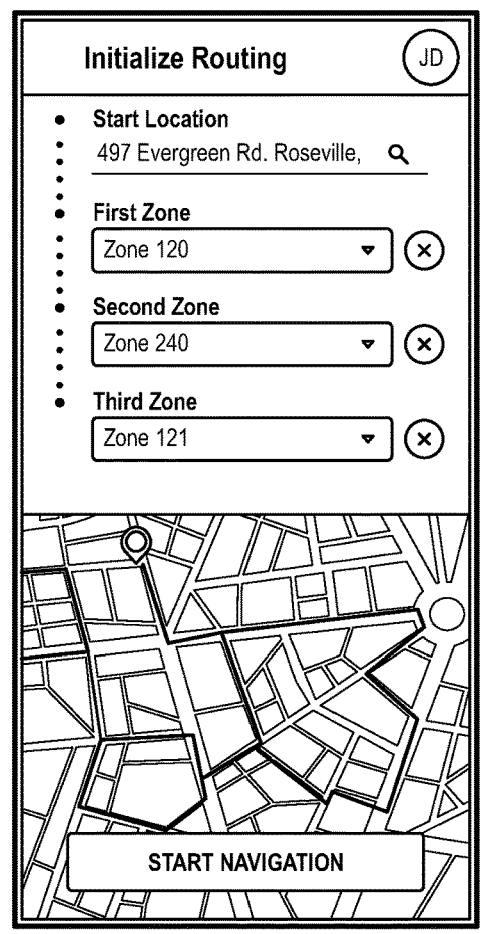

FIG. 11 illustrates images of a GUI screen 162 and a GUI screen 164 that can allow a parking enforcement officer to initialize routing, in accordance with an embodiment. The GUI screen 162 and the GUI screen 164 show the addition of more zones to the route. The distinction amongst the three zones can be shown with a difference in the color or shading of the zones as well as in their intensity. The intensity of the color or the shading can decrease with the priority of the zones.

Figure 12:
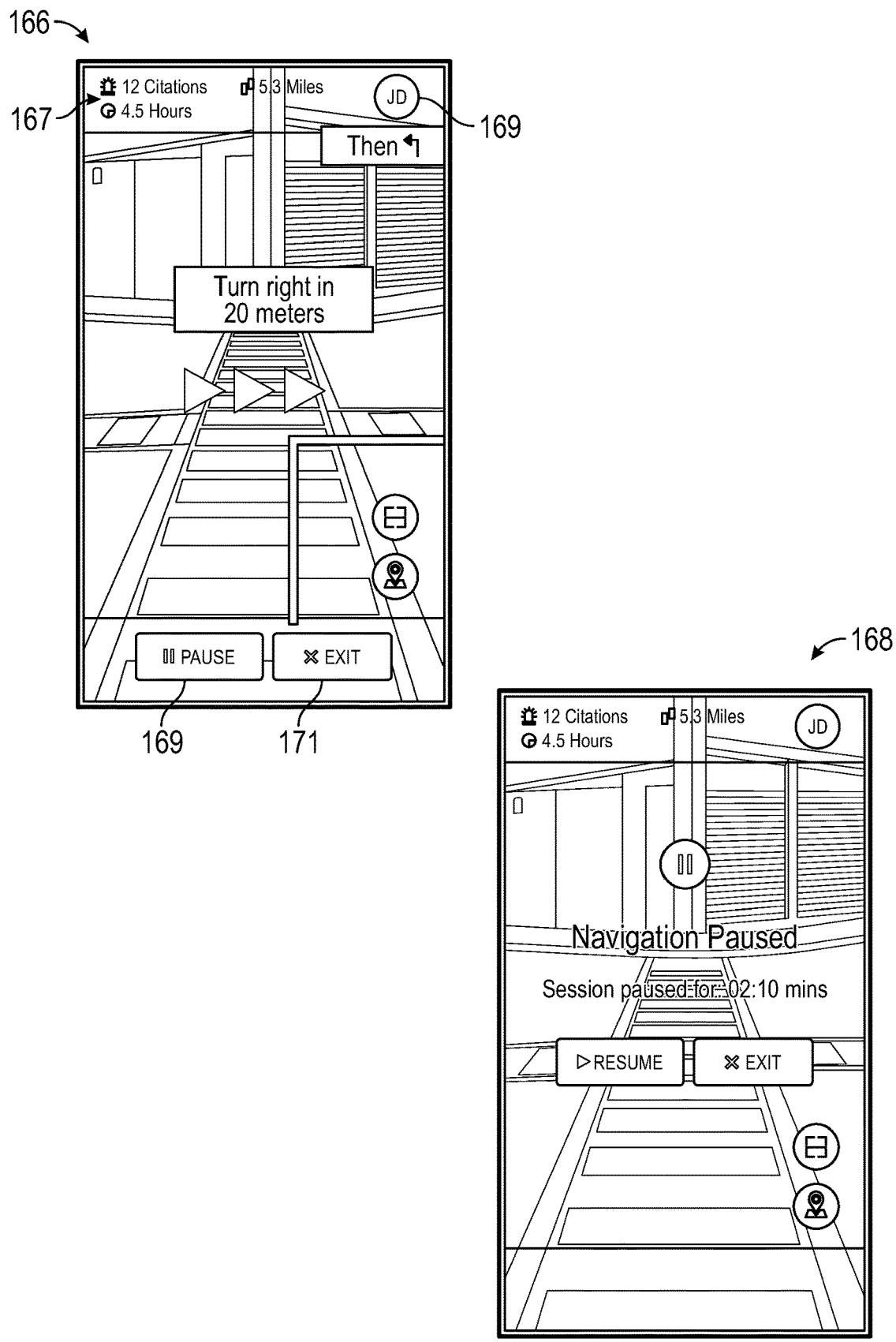
FIG. 12 illustrates images of GUI screens that allow a parking enforcement officer to begin navigation with an augmented reality view after the route is initialized, in accordance with an embodiment.

FIG. 12 illustrates images of a GUI screen 166 and a GUI screen 168 that allow a parking enforcement officer to begin navigation with an AR view after the route is initialized, in accordance with an embodiment. After the route is initialized, the officer can start the navigation and the GUI screens 166 and 168 depicted in FIG. 12 show the AR view of the navigation. The top bar 167 can display the number of citations that the officer has submitted for the day, the total distance travelled, and total number of hours spent in patrolling. A profile icon 169 can also be displayed on the right top corner of each GUI screen 166 and 168, which can contain information such as his or her daily or weekly or monthly stats on patrolling and other activities while on duty. The main screen (e.g., GUI screen 166) shows the AR view of the street along with the real time directions to guide the user to the required destination with the upcoming direction instructions. The bottom of the GUI screen 166, for example, can include the option of pausing or exiting the navigation via a pause button 169 and an exit button 171.

The second GUI screen 168 depicted in FIG. 12 shows the pause screen when the user is off duty where the amount of time that has been paused can also be displayed (e.g., "Session paused for: 02:10 mins").

Figure 13:
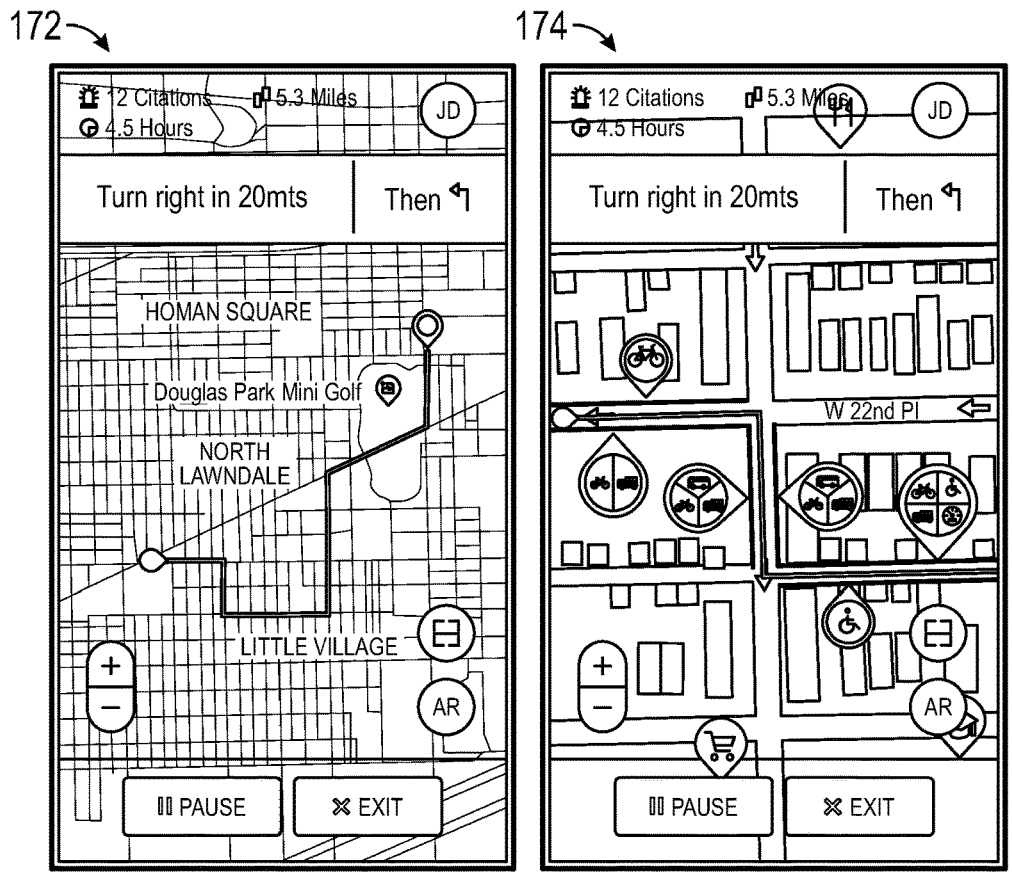
FIG. 13 illustrates images of GUI screens that can display an Issue Citation view and a Map view of the navigation, in accordance with an embodiment.

FIG. 13 illustrates images of a GUI screen 172 and a GUI screen 174 that can respectively display an issue citation view and a map view of the navigation, in accordance with an embodiment. That is, the main navigation screen can display two additional buttons for "Issue Citation" and "Map view" of the navigation.

Upon "clicking" of the map view button in the main navigation screen, the user can see GUI screen 172, which displays a 2D map view of the same navigation where the user can see his or her current location and the direction to the required destination along with the upcoming direction instructions. Each GUI screen 172 and 174 can include a bottom bar. The functionalities of the bottom bar can include a Pause button and an Exit button, which is the same across all main screens.

The zoom in and out buttons in the map view can help the user see the block face markers along his or her route path. GUI screen 174 shows the markers with icons depicting the type of restrictions applicable for that block face and the duration for which it may be applicable. For example, as shown in GUI screen 174, the marker with only a bike symbol therein indicates that the block face may be blocked for only bike parking. Similarly, the markers with two or more symbols therein indicate that the block face may be restricted either for commercial loading, buses, disabled parking, meter parking or residential parking, etc.

Figure 14:
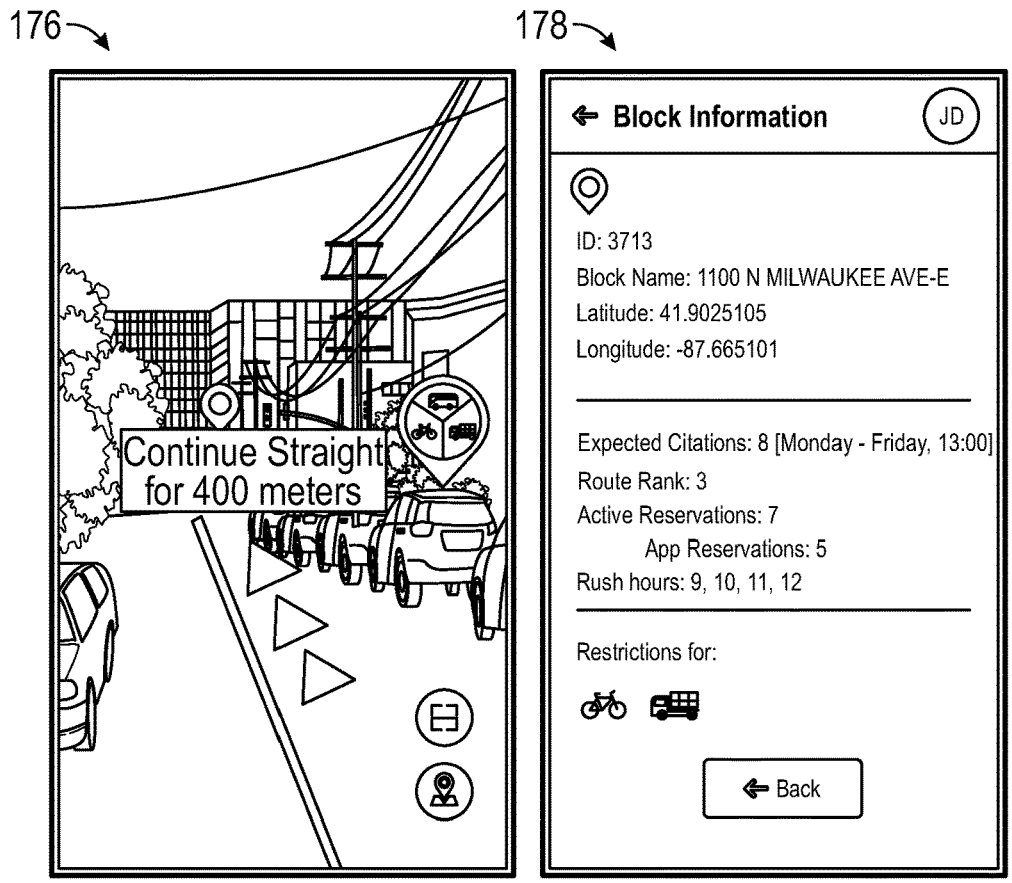
FIG. 14 illustrates images of GUI screens that can display block face markers in an augmented reality view of the navigation and also provide block information, in accordance with an embodiment.

FIG. 14 illustrates images of a GUI screen 176 and a GUI screen 178 that can display block face markers in an AR view of the navigation and also provide block information, in accordance with an embodiment. The block face markers can also be seen in the AR view of the navigation in GUI screen 176. As the user goes moves along the route, the AR view shown in GUI screen 176 can enable the user to see the most immediate block face markers along with the next markers, which can be in a relative reduced size in order to create the sense of priority for the user and reduce his or her cognitive load as he or she traverse the route.

If the user "clicks" on the markers, a detailed view of the block information can appear for the user to refer for better decision-making as shown in GUI screen 178. The information on the ID, block name, latitude, longitude, expected citation, route rank, active reservations, rush hours (if any) and restrictions (if any) for the block face can be displayed in the information screen (i.e., GUI screen 178) with respect each of the markers.

Figure 15:
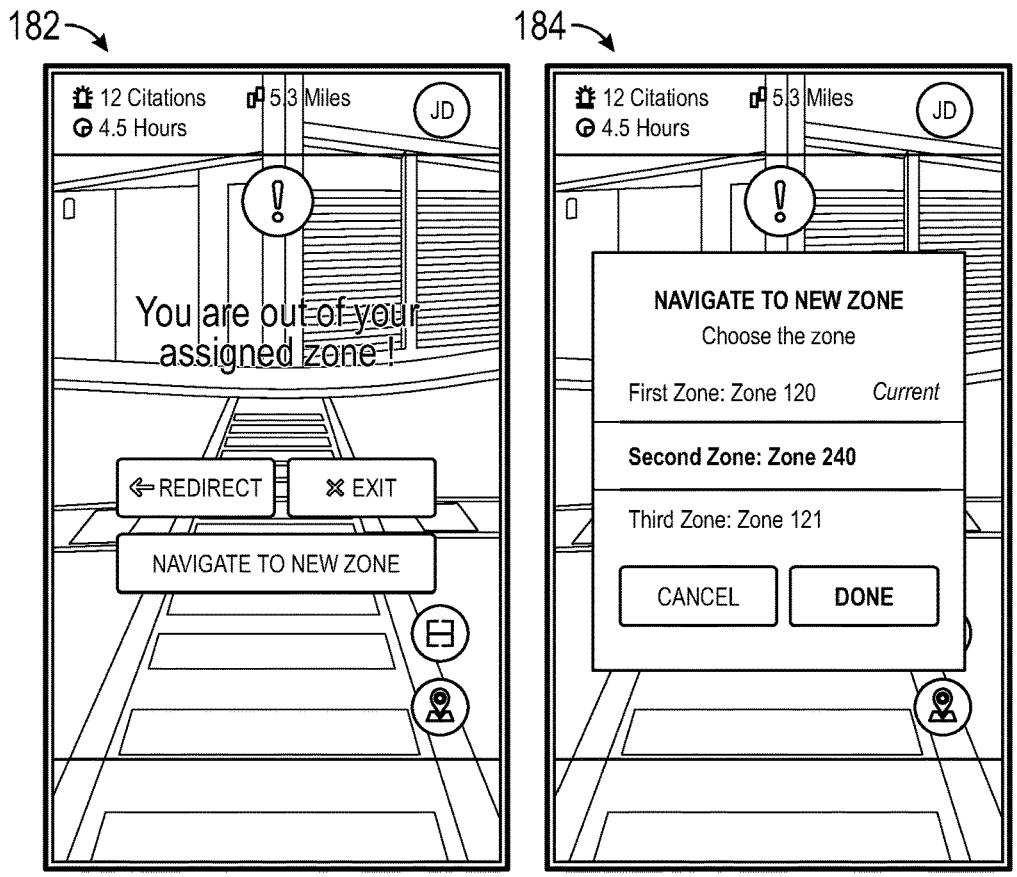
FIG. 15 illustrates images of GUI screens that display data indicating that a parking enforcement office may be out of his or her assigned zone, in accordance with an embodiment.

FIG. 15 illustrates images of a GUI screen 182 and a GUI screen 184 that can display data indicating that a parking enforcement office may be out of his or her assigned zone, in accordance with an embodiment. While routing in a particular zone, if the officer goes out of the zone in any case, the application can prompt an alert screen (as shown in GUI screen 182) for the user where he or she can either take actions such as redirecting back to the current zone that he or she was traversing or exit the navigation or navigate to a new zone. The "Navigate to New Zone" option, if clicked, can prompt the user to choose the new zones from the list of three zones already chosen in the initializing route phase. After the selection of the new zone from the list, the user can be directed to the new zone from their current position in any zone.

Figure 16:
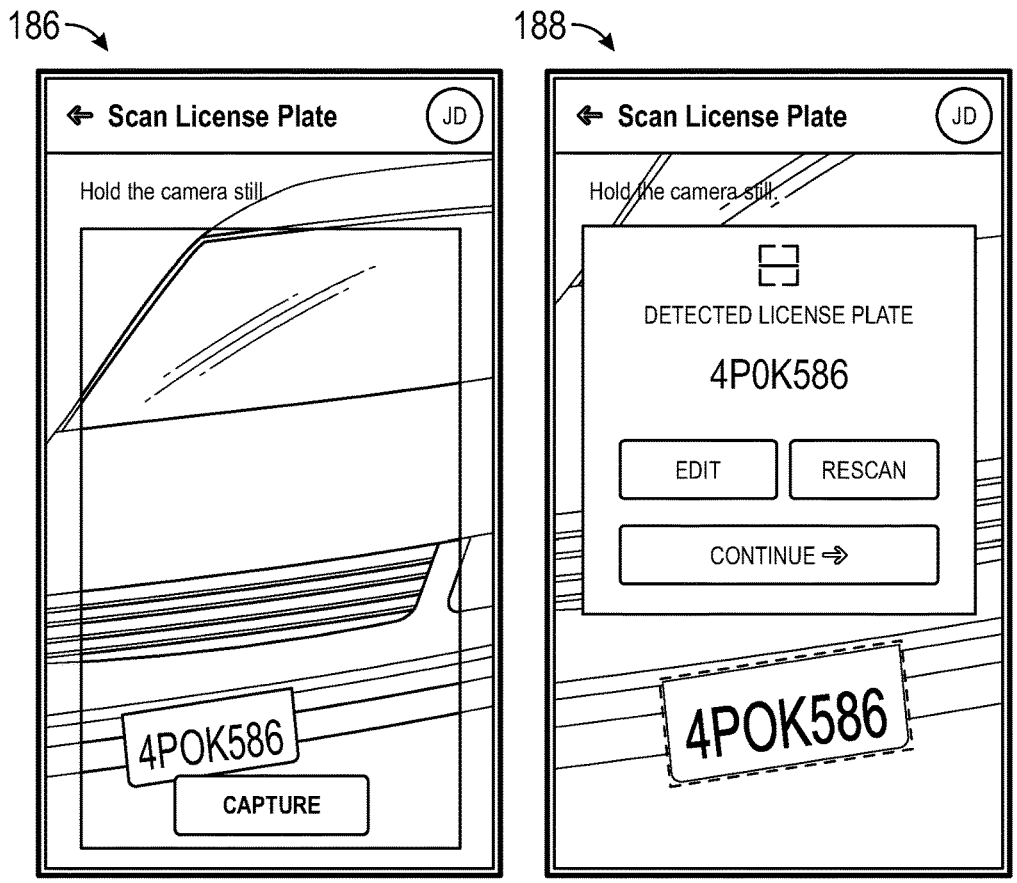
FIG. 16 illustrates images of GUI screens that facilitate scanning of a vehicle license plate, in accordance with an embodiment.

FIG. 16 illustrates images of a GUI screen 186 and a GUI screen 188 that can facilitate scanning of a vehicle license plate, in accordance with an embodiment. From the main navigation screen (either in AR mode or map mode), the user can choose to scan the license plate of the vehicle for submitting the information for issuing citations. The GUI screen 187 shows the scan screen where the user must hold the camera still pointing to the vehicle license plate and capture that image for successful detection of the license plate. GUI screen 188 can display the license plate number detected with the license plate highlighted in the image for matching the information. The user can be provided with an option to continue with the automatically detected license plate with the state of issuance or can be provided with an option to rescan the plate again or edit the license plate manually as shown in the GUI screen 192 in FIG. 17.

Figure 17:
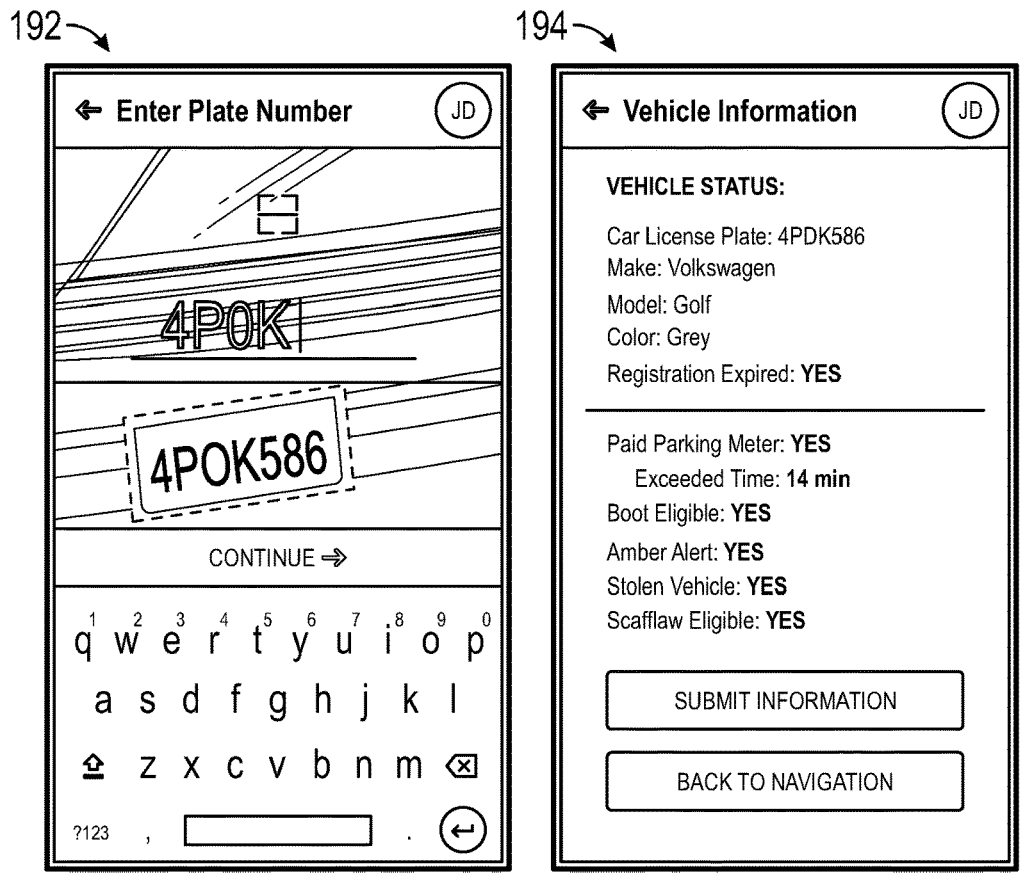
FIG. 17 illustrates images of GUI screens that can provide a user with an option to continue with an automatically detected license plate or rescan the license place and edit the license plate information manually, in accordance with an embodiment.

FIG. 17 illustrates images of the GUI screen 192 and a GUI screen 192 that can provide a user with an option to continue with an automatically detected license plate or rescan the license place and edit the license plate information manually, in accordance with an embodiment.

Once the detected license plate is verified by the user to be correct, the user can continue to see the complete vehicle status associated to that license plate, which can include information such as the make, model, color of the vehicle, violations (if any, such as exceeding time on a paid meter parking), compliance with residential permitting, vehicle wheel tax/city sticker registration, license plate registration, boot eligibility, Amber alert, stolen vehicle and scofflaw eligibility. Such information can be highlighted in red or another color or shading. When the officer submits the information successfully, this information can be captured for the officer to help him issue a citation without much difficulty.

Figure 18:
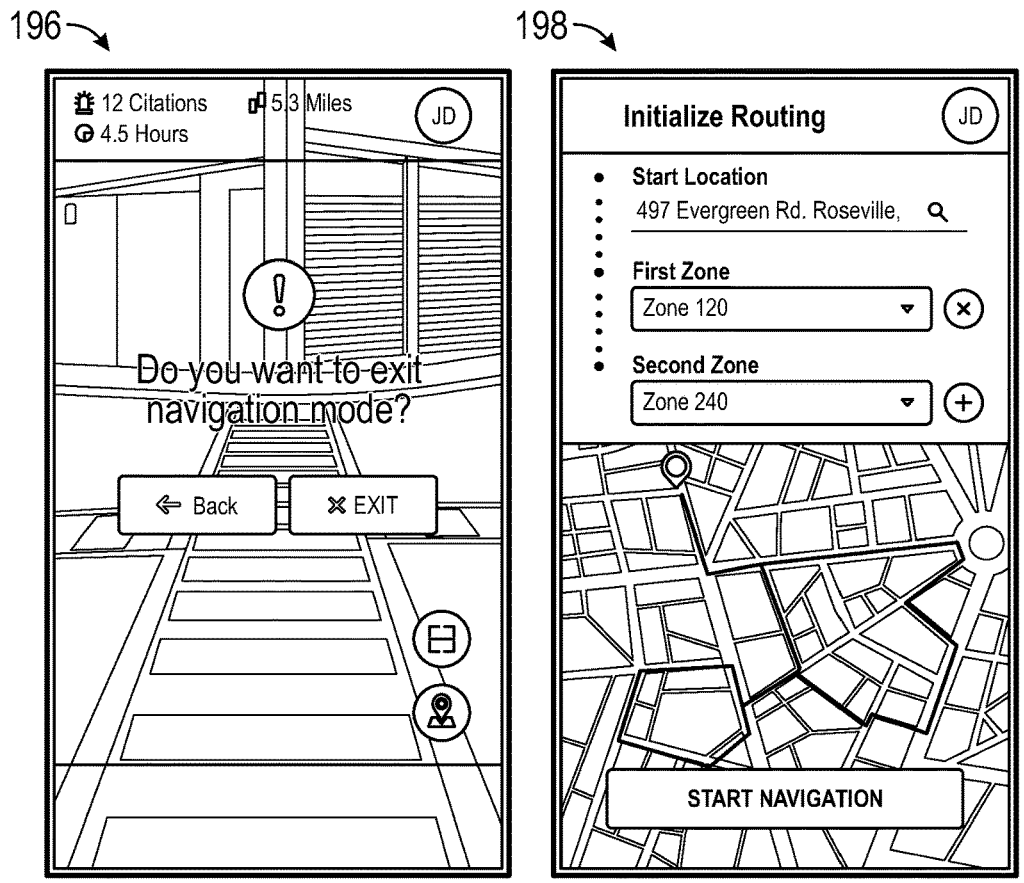
FIG. 18 illustrates images of GUI screens for facilitating an exit process, in accordance with an embodiment.

FIG. 18 illustrates images of a GUI screen 196 and a GUI screen 198 for facilitating an exit process, in accordance with an embodiment. If the user wants to exit the navigation, the GUI screen 197 can appear as an alert for the user to confirm the exit process. Once the user exits the navigation, he or she can return to the initialize route page as shown in GUI screen 198. The user can exit the application completely once they close the application on his or her device, which can erase the on-going session.

Figure 19:
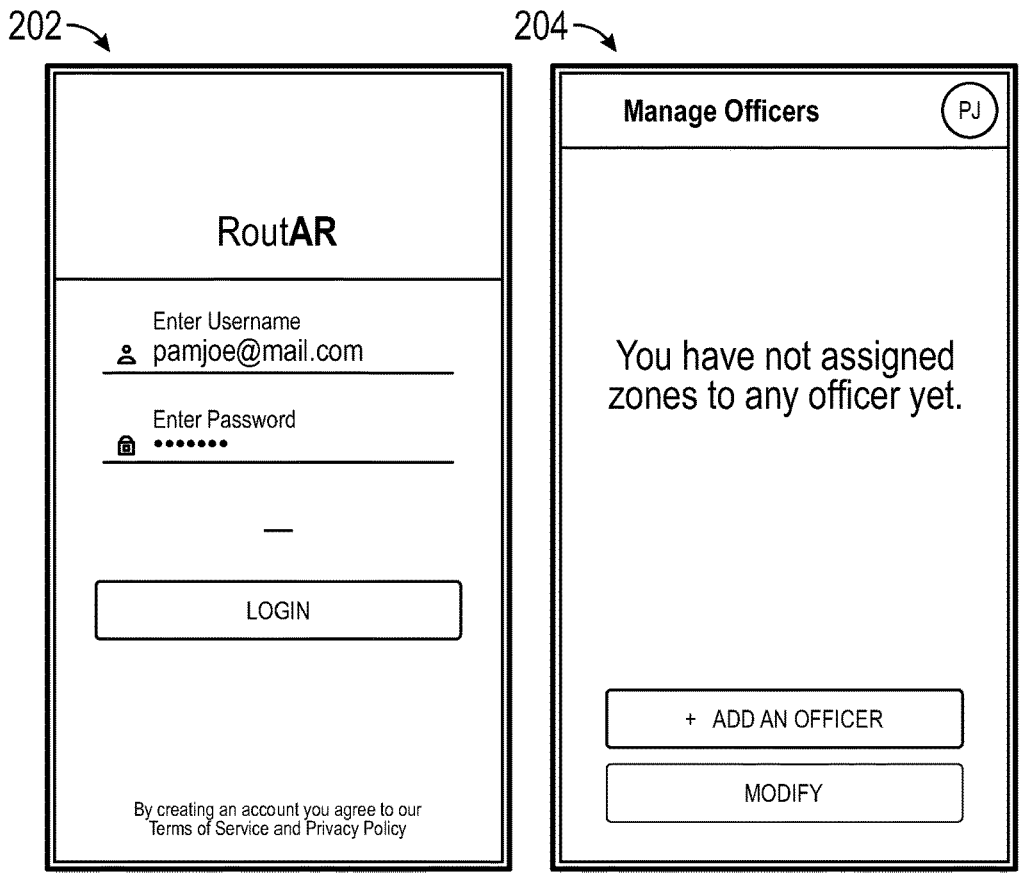
FIG. 19 illustrates images of GUI screens that can be accessed by a parking enforcement manager, in accordance with an example embodiment.

FIG. 19 illustrates images of a GUI screen 202 and a GUI screen 204 that can be accessed by a parking enforcement manager, in accordance with an example embodiment. The law enforcement manager generally has the following tasks: adding and assigning law enforcement officers under him or her to zones, prioritizing the zones assigned to each officer, and modifying the information of officers.

The manager has to login to the application with his or credential via a GUI screen such as the GUI screen 202 to access the application. If the manager has not added any officers under him or her to any zone, then the GUI screen 204 can be displayed where the option to add new officers is provided (e.g., see the "ADD AN OFFICER" button displayed in the GUI screen 204).

Figure 20:
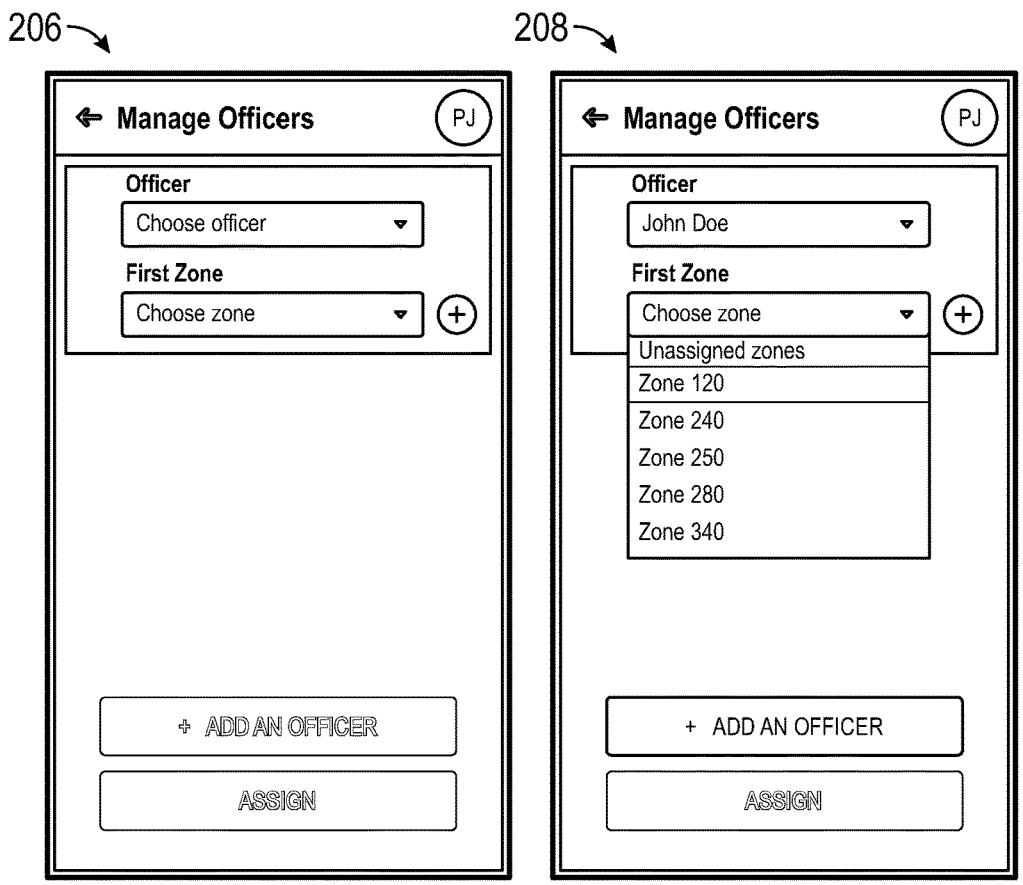
FIG. 20 illustrates images of GUI screens that allow a parking enforcement manager to access the application with their credentials including an option to add new parking enforcement officers, in accordance with an embodiment.

FIG. 20 illustrates images of a GUI screen 206 and a GUI screen 208 that can allow a parking enforcement manager to access the application with their credentials including an option to add new parking enforcement officers, in accordance with an embodiment. The GUI screen 206 can indicate when any officer is added to the list. The manager has option to choose an officer from a drop-down list and assign his or her first zone from the list of unassigned zones for the first officer, as shown in the GUI screen 206.

Figure 21:
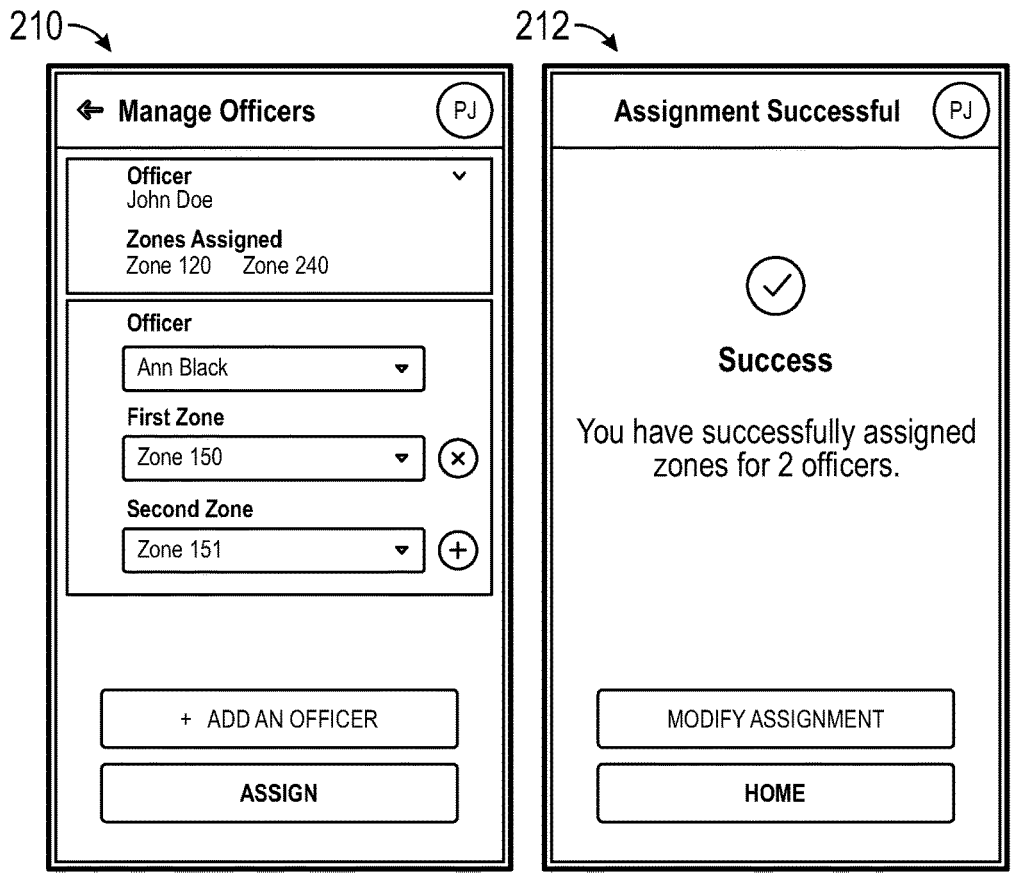
FIG. 21 illustrates images of GUI screens that allow a parking enforcement manager to assign zones to parking enforcement officers, in accordance with an embodiment.

FIG. 21 illustrates images of a GUI screen 210 and a GUI screen 212 that allow a parking enforcement manager to assign zones to parking enforcement officers, in accordance with an embodiment. The manager can add multiple zones for an officer in a prioritized manner can also add multiple officers at the same time by the "Add an Officer" option shown in GUI screen 2110. After the manager has assigned all the officers under him to some zones, he can "click" the Assign option displayed in GUI screen 210 to successfully assign zones to all those officers. From here, the manager can either modify the assignment or go to the home page where the list of all assigned officers can be available for him or her to view.

Figure 22:
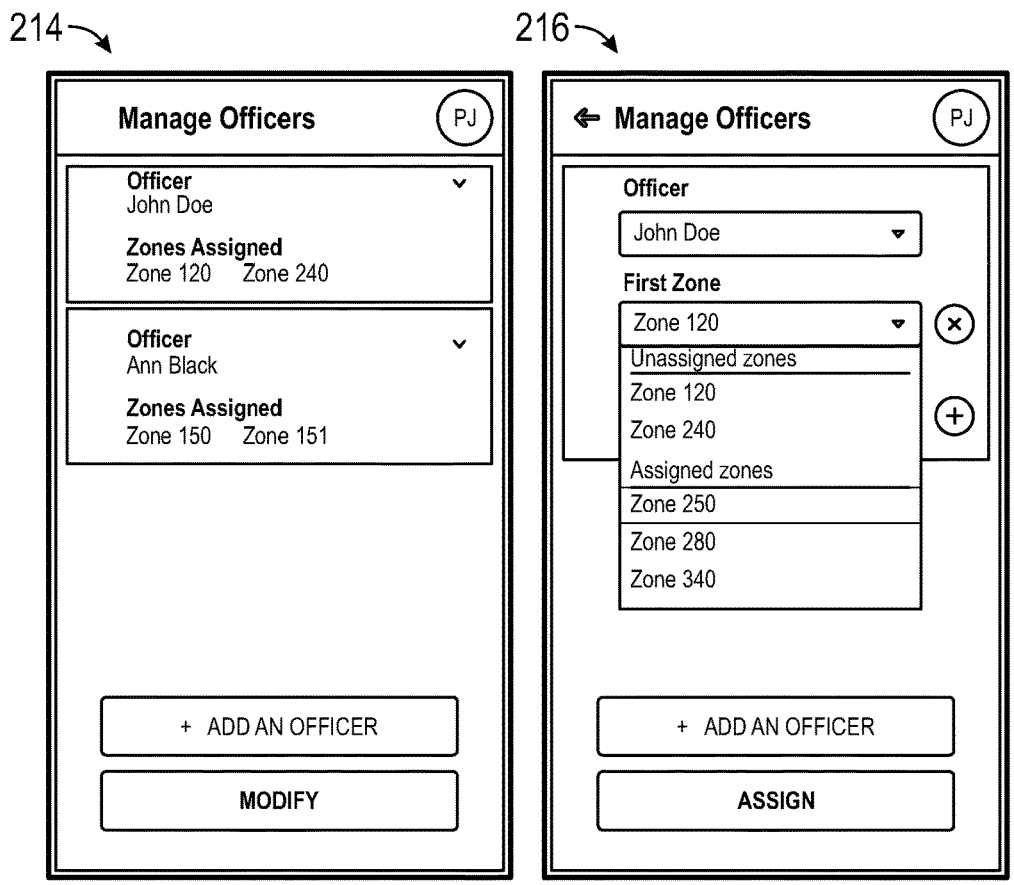
FIG. 22 illustrates images of GUI screens that allow a parking enforcement manager to modify assignments for parking enforcement officers, in accordance with an embodiment.

FIG. 22 illustrates images of a GUI screen 214 and a GUI screen 216 that allow a parking enforcement manager to modify assignments for parking enforcement officers, in accordance with an embodiment. If the manager wishes to modify any assignment, he or she can do so from the Modify option displayed in GUI screen 214 and change the option from the drop-down list. On modification, the drop-down list of the zones can be segregated as unassigned zones and assigned zones for making the selection easier for the manager. (Note: In this application, the manager can assign same zones to multiple officers).

Below are examples of possible implementations for features such as the previously discussed REST API and so on.

REST API
Validate User Login
@app.route('/get_login', methods=['GET'])
"'select * from public.employee_info where public.employee_info.login=% s and
public.employee_info.password=% s'"
cursor.execute(login_query, (login, password))
View Officer's Allocated Zones
@app.route('/get_assigned_zones', methods=['GET'])
"'select * from public.zone_allocations where public.zone_allocations."empID"=% s
ORDER BY date_assigned DESC LIMIT 1'"
Concatenate each zone and merge with Zone Boundaries to get Zone polygon
View List of Officers and Allocated Zones
@app.route('/get_assigned_info', methods=['GET', 'POST'])
"SELECT public.zone_allocations."empID", public.employee_info."name",
public.zone_allocations.zone_priority_1, public.zone_allocations.zone_priority_2,
public.zone_allocations.zone_priority_3 FROM public.employee_info,
public.zone_allocations where public.employee_info."empID"=
public.zone_allocations."empID" and public.employee_info."managerID"=
CAST(passed_empID as TEXT) ORDER BY public.zone_allocations.date_assigned DESC'"
Get single zone column by contatenating priorities in sequence:
officer_db_['zone']=officer_db[['zone_priority_1', 'zone_priority_2', 'zone_priority_3']].apply(lambda x: ','.join(x[x.notnull( )], axis=1)
Remove duplicates by officer ID
Assign Zones to an Officer
@app.route('/assign_zones', methods=['GET', 'POST'])
"'INSERT INTO public.zone_allocations("empID", "assignedBy", zone_priority_1, zone_priority_2, zone_priority_3, date_assigned) VALUES (% s, % s, % s, % s, % s, TIMESTAMP WITH TIME ZONE % s)'"
cursor.execute(query, (empID, assignedBy, zone_priority_1, zone_priority_2, zone_priority_3, date_assigned))

View Available and Assigned Zones
@app.route('/get_zone_allocations', methods=['GET', 'POST'])
"'SELECT * FROM public.zone_allocations GROUP BY public.zone_allocations."empID" ORDER BY public.zone_allocations.date_assigned DESC LIMIT 1'"
Extract list of assigned zones
Get available zones by eliminating assigned zones from the total zone list
Retrieve Vehicle Details
@app.route('/get_vehicle_details', methods=['GET', 'POST'])
Verify if vehicle in boot list
Verify if vehicle in scofflaw list
Verify if vehicle is on amber alert list
Verify if vehicle is on stolen list
Verify if vehicle has paid for parking and capture time exceeded from parking
Obtain the Zonal Route
@app.route('/get_route', methods=['GET', 'POST'])
Given current latitude and longitude, get the closest block to location.
Given the day of the week and hour, retrieve the route data from proprietary enforcement routing algorithm.
Retrieve regulations for each block name: bus, disabled parking, commercial, no parking, rush hour parking and hours, meter parking and hours, and resident permit parking and hours.
Update Duty Status
@app.route('/update_duty_status', methods=['GET', 'POST'])
'INSERT INTO public.dutystatus_log ("empID", duty_status, timestamp) VALUES(% s, % s, TIMESTAMP WITH TIME ZONE % s)', (empID, duty_status, timestamp)
@app.route('/get_recent_duty_status', methods=['GET', 'POST'])
"'select *from public.dutystatus_log where public.dutystatus_log."empID"=% s order by public.dutystatus_log.timestamp DESC LIMIT 1'"
cursor.execute(duty_status_query, (empID,))
Capture a Citation
@app.route('/update_citation', methods=['GET', 'POST'])
"'INSERT INTO public.citation_log("citationTime", "issuerID", "vehicleID", vehicle_make, vehicle_model, vehicle_color, boot_eligible, scofflaw_eligible, paid_online, paid_time_exceeded, stolen_alert, amber_alert, block_name, lat, "long") VALUES (TIMESTAMP WITH TIME ZONE % s, % s, % s, % s, % s, % s, % s, % s, % s, % s, % s, % s, % s, % s, % s)'"
cursor.execute(query, (citationTime, issuerID, vehicleID, vehicle_make, vehicle_model, vehicle_color, boot_eligible, scofflaw_eligible, paid_online, paid_time_exceeded, stolen_alert, amber_alert, block_name, lat, long))
Store a Session Log
@app.route('/update_session_log', methods=['GET', 'POST']) "'INSERT into public.officer_session_log("empID", route_covered, start_time, end_time, n_citations, n_miles, time_travelled, zone_priority_1, zone_priority_2, zone_priority_3) VALUES (% s, % s, TIMESTAMP WITH TIME ZONE % s, TIMESTAMP WITH TIME ZONE % s, % s, % s, % s, % s, % s, % s)'"
cursor.execute(query, (empID, route_covered, start_time, end_time, n_citations, n_miles, time_travelled, zone_priority_1, zone_priority_2, zone_priority_3))

RoutAR Scripts

ZonePoly.cs

This script can handle the Initialize route scene, which can be implemented to obtain the zone boundary latitudes and longitudes assigned to the officer and converts them to Vector3 for Unity world coordinates, followed by creation of polygonal mesh that can be displayed on the map. Boundary( ) functions can create a polygonal area using the coordinates and displays on the map.

```
public void Boundary( )
{
    if (pol != null)
    {
        Destroy(pol);
    }
    var objects = Resources.FindObjectsOfTypeAll<GameObject>( ).Where(obj => obj.name == "polygon_z");
    foreach(var obj in objects)
    {
        Destroy(obj);
    }
    var boundaries = new List<Vector2>( );
    int k = 1;
    for (int i = 0; i < RootObject.CreateFromJSON(jsondata).root.Count; i++)
    {
        if (k == RootObject.CreateFromJSON(jsondata).root[i].order)
        {
            k++;
            boundaries.Add(new Vector2((float)Conversions.GeoToWorldPosition(poly_data[i].x, poly_data[i].y, _map.CenterMercator, _map.WorldRelativeScale).x, (float)Conversions.GeoToWorldPosition(poly_data[i].x, poly_data[i].y, _map.CenterMercator, _map.WorldRelativeScale).y));
        }
        else
        {
            i = i - 1;
            boundaries.RemoveAt(k - 2);
            k = 1;
            makeregion(boundaries);
            boundaries.Clear( );
        }
    }
    boundaries.RemoveAt(k - 2);
    makeregion(boundaries);
    boundaries.Clear( );
}
```

40
AddOfficer.cs and AddZonesForManager.cs
These scripts handle Manager view. Add Officer allows a manager to add an officer and assign zone to him/her. AddZonesForManager helps in populating the dropdowns for assigned officer and available zones.

```
IEnumerator PopulateZones(string id)
{
    UnityWebRequest www = UnityWebRequest.Get("http://indcliavmiotar1.eastus.cloudapp.azure.com:5000/get_available_zones?empID="+id+"&: timestamp="+ System.DateTime.Now.ToString("yyyy-MM-dd HH:mm:ss") +"-06");
    yield return www.SendWebRequest( );
    if (www.isNetworkError || www.isHttpError)
    {
        Debug.Log(www.error);
        Debug.Log(www.responseCode);
    }
    else
    {
        // Show results as text
        Debug.Log(www.downloadHandler.text);
        Debug.Log(www.responseCode);
        // Or retrieve results as binary data
        results = www.downloadHandler.text.Replace("[", string.Empty);
        results = results.Replace("]", string.Empty);
    }
    if (www.responseCode == 200)
    {
        zones = results.Split(',');
```

-continued

```
            for (int i = 0; i < zones.Length; i++)
            {
                zones[i] = zones[i].Replace(""" string.Empty).Trim( );
                Debug.Log(zones[i]);
            }
            List<string> options = new List<string>( );
            var zonedropdown = GameObject.Find("Canvas/AddOfficerPanels/" +
this.transform.parent.name + "/" + gameObject.name + "/First
zone/Dropdown").GetComponent<Dropdown>( );
            foreach (var option in zones)
            {
                options.Add(option);
            }
            zonedropdown.ClearOptions( );
            zonedropdown.AddOptions(options);
        }
        else
        {
            Debug.Log("Network error");
        }
    }
```

Polygon Coloring
This snippet is used to determine the color of the polygon being rendered on the map.

```
if (polygon1 != null)
    {
        Destroy(polygon1);
    }
    polygon1 = new GameObject("polygon_zone" + counter);
    var mesh = polygon1.AddComponent<MeshFilter>( ).mesh;
    mesh.subMeshCount = data.Triangles.Count;
    mesh.SetVertices(data.Vertices);
    _counter = data.Triangles.Count;
    for (int i = 0; i < _counter; i++)
    {
        var triangle = data.Triangles[i];
        mesh.SetTriangles(triangle, i);
    }
    _counter = data.UV.Count;
    for (int i = 0; i < _counter; i++)
    {
        var uv = data.UV[i];
        mesh.SetUVs(i, uv);
    }
    mesh.RecalculateNormals( );
    polygon1.AddComponent<MeshRenderer>( ).material = _material;
    if (counter == 1)
    {
        polygon1.GetComponent<MeshRenderer>( ).material.color = new
Color32(37, 118, 109, 255);
    }
    return polygon1;
```

OpenARNavigation.cs

This script handles AR Navigation scene and Map Scene.

IEnumerator GetRoute(string Zone): This coroutine allows to get the routes for a particular zone and pass them to DirectionFactory.cs for creating a route for navigation.

IEnumerator GetCoordinates( ): This coroutine converts coordinates(latitude-longitude) to the Geocode(name of the place).

OnSubmitButtonClicked( ): This function uploads the vehicle related information to the AWS server hence capturing violation OnDutyStatusChanged( ): This function changes the duty status of the officer when he/she pauses the navigation IEnumerator OnExitNavigation( ): This function exits the navigation and update work log of the officer.

OutOfZoneCheck.cs

TThis script helps in checking whether the officer is inside in the zone assigned to him or not. A warning will pop up when he gets outside the assigned zone. He may redirect to his current zone or navigate to another zone assigned to him.

```
void LocationProvider_OnLocationUpdated(Location location)
{
```

```
        if (_isInitialized && location.IsLocationUpdated && checkpoint)
        {
            bool inside=true;
            lat = location.LatitudeLongitude.x;
            lon = location.LatitudeLongitude.y;
            PointStatus obj = new PointStatus( );
            if(currentZone==1)
            {
                    inside=obj.ContainsPoint(zone1.ToArray( ), new Vector2d(lat, lon));
            }
            else if(currentZone==2)
            {
                    inside=obj.ContainsPoint(zone2.ToArray( ), new Vector2d(lat, lon));
            }
            else if (currentZone == 3)
            {
                    inside=obj.ContainsPoint(zone3.ToArray( ), new Vector2d(lat, lon));
            }
            if(!inside)
            {
                OutofZone.SetActive(true);
                checkpoint = false;
                Invoke("UpdateCheckpoint", 60f);
            }
        }
    }
    void UpdateCheckpoint( )
    {
        checkpoint = true;
    }
}
//This will check whether a point p lies inside the polyPoints polygon
public class PointStatus
{
    public bool ContainsPoint(Vector2d[ ] p, Vector2d v)
    {
        int j = p.Length − 1;
        bool c = false;
        for (int i = 0; i < p.Length; j = i++) c ^= p[i].y > v.y ^ p[j].y > v.y && v.x < (p[j].x −
p[i].x) * (v.y − p[i].y) / (p[j].y − p[i].y) + p[i].x;
        Debug.Log("Point inside:::" + c+"point is:::"+v.x+","+v.y+"Inside::::"+p[1].x);
        return c;
    }
}
```

The disclosed embodiments are described at least in part herein with reference to the flowchart illustrations, steps and/or block diagrams of methods, systems, and computer program products and data structures and scripts. It will be understood that each block of the illustrations, and combinations of blocks, can be implemented by computer program instructions. These computer program instructions may be provided to a processor of, for example, a general-purpose computer, special-purpose computer, or other programmable data processing apparatus to produce a machine, such that the instructions, which can execute via the processor of the computer or other programmable data processing apparatus, and may create means for implementing the functions/acts specified in the block or blocks.

To be clear, the disclosed embodiments can be implemented in the context of, for example a special-purpose computer or a general-purpose computer, or other programmable data processing apparatus or system. For example, in some example embodiments, a data processing apparatus or system can be implemented as a combination of a special-purpose computer and a general-purpose computer. In this regard, a system composed of different hardware and software modules and different types of GUI features may be considered a special-purpose computer designed with a purpose of enabling MR and AR applications such as discussed herein, an in particular in the context of parking enforcement. In general, however, embodiments may be implemented as a method, and/or a computer program product at any possible technical detail level of integration. The computer program product may include a computer readable storage medium (or media) having computer readable program instructions thereon for causing a processor to carry out aspects of the embodiments, such as the steps, operations or instructions described herein.

The aforementioned computer program instructions may also be stored in a computer-readable memory that can direct a computer or other programmable data processing apparatus to function in a particular manner, such that the instructions (e.g., steps/operations) stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks herein.

The flow charts and block diagrams in the figure can illustrate the architecture, the functionality, and the operation of possible implementations of systems, methods, and computer program products according to various embodiments (e.g., preferred or alternative embodiments). In this regard, each block in the flow chart or block diagrams may represent a module, a segment, or a portion of instructions, which comprises one or more executable instructions for implementing the specified logical function(s).

In some alternative implementations, the functions noted in the blocks may occur out of the order noted in the figures. For example, two blocks shown in succession may, in fact, be executed concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The functionalities described herein may be implemented entirely and non-abstractly as physical hardware, entirely as physical non-abstract software (including firmware, resident software, micro-code, etc.) or combining non-abstract software and hardware implementations that may all generally be referred to herein as a "circuit," "module," "engine", "component," "block", "database", "agent" or "system." Furthermore, aspects of the present disclosure may take the form of a computer program product embodied in one or more non-ephemeral computer readable media having computer readable and/or executable program code embodied thereon.

Figure 23:
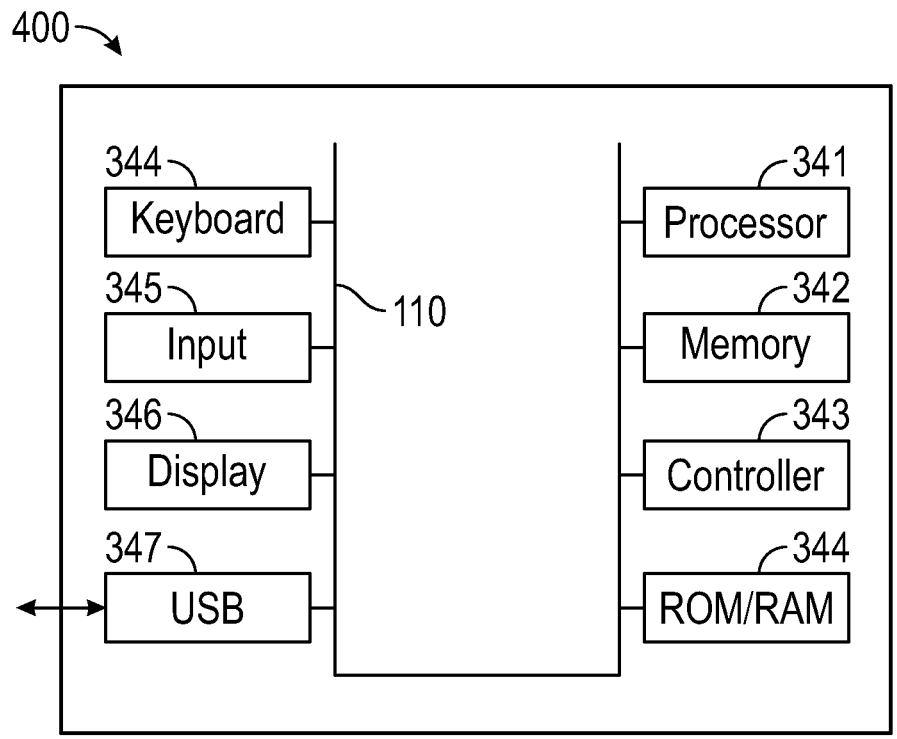
FIG. 23 illustrates a schematic view of a computer system, in accordance with an embodiment.
Figure 24:
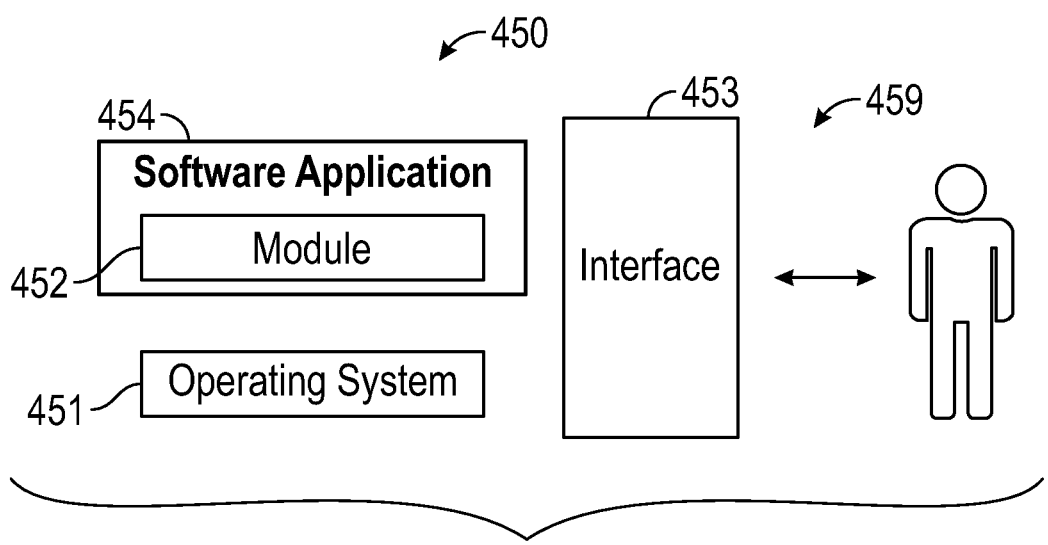
FIG. 24 illustrates a schematic view of a software system including a module, an operating system, and a user interface, in accordance with an embodiment.

FIGS. 23-23 are shown only as exemplary diagrams of data-processing environments in which example embodiments may be implemented. It should be appreciated that FIGS. 23-24 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 23, some embodiments may be implemented in the context of a data-processing system 400 that can include, for example, one or more processors such as a processor 341 (e.g., a CPU (Central Processing Unit) and/or other microprocessors), a memory 342, a controller 343, additional memory such as ROM/RAM 332 (i.e. ROM and/or RAM), a peripheral USB (Universal Serial Bus) connection 347, a keyboard 344 and/or another input device 345 (e.g., a pointing device, such as a mouse, track ball, pen device, etc.), a display 346 (e.g., a monitor, touch screen display, etc) and/or other peripheral connections and components. The database 114 illustrated and discussed previously herein may in some embodiments be located with, for example, the memory 342 or another memory.

The system bus 110 serves as the main electronic information highway interconnecting the other illustrated components of the hardware of data-processing system 400. In some embodiments, the processor 341 may be a CPU that functions as the central processing unit of the data-processing system 400, performing calculations and logic operations required to execute a program. Read only memory (ROM) and random access memory (RAM) of the ROM/RAM 344 constitute examples of non-transitory computer-readable storage media.

The controller 343 can interface with one or more optional non-transitory computer-readable storage media to the system bus 110. These storage media may include, for example, an external or internal DVD drive, a CD ROM drive, a hard drive, flash memory, a USB drive or the like. These various drives and controllers can be optional devices. Program instructions, software or interactive modules for providing an interface and performing any querying or analysis associated with one or more data sets may be stored in, for example, ROM and/or RAM 344. Optionally, the program instructions may be stored on a tangible, non-transitory computer-readable medium such as a compact disk, a digital disk, flash memory, a memory card, a USB drive, an optical disc storage medium and/or other recording medium As illustrated, the various components of data-processing system 400 can communicate electronically through a system bus 351 or similar architecture. The system bus 351 may be, for example, a subsystem that transfers data between, for example, computer components within data-processing system 400 or to and from other data-processing devices, components, computers, etc. The data-processing system 400 may be implemented in some embodiments as, for example, a server in a client-server based network (e.g., the Internet) or in the context of a client and a server (i.e., where aspects are practiced on the client and the server).

In some example embodiments, data-processing system 400 may be, for example, a standalone desktop computer, a laptop computer, a Smartphone, a pad computing device and so on, wherein each such device is operably connected to and/or in communication with a client-server based network or other types of networks (e.g., cellular networks, Wi-Fi, etc).

FIG. 24 illustrates a computer software system 450 for directing the operation of the data-processing system 400 depicted in FIG. 23. The software application 454, may be stored for example in memory 342 and/or another memory and can include one or more modules such as the module 452. The computer software system 450 also includes a kernel or operating system 451 and a shell or interface 453. One or more application programs, such as software application 454, may be "loaded" (i.e., transferred from, for example, mass storage or another memory location into the memory 342) for execution by the data-processing system 400. The data-processing system 400 can receive user commands and data through the interface 453; these inputs may then be acted upon by the data-processing system 400 in accordance with instructions from operating system 451 and/or software application 454. The interface 453 in some embodiments can serve to display results, whereupon a user 459 may supply additional inputs or terminate a session. The software application 454 can include module(s) 452, which can, for example, implement the steps, instructions, operations and scripts such as those discussed herein.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" (also referred to as an "engine") may constitute a software application, but can also be implemented as both software and hardware (i.e., a combination of software and hardware).

Generally, program modules include, but are not limited to, routines, subroutines, software applications, programs, objects, components, data structures, etc., that perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein can refer to a collection of routines and data structures, which can perform a particular task or can implement a particular data type. A module can be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application, such as a computer program designed to assist in the performance of a specific task, such as word processing, accounting, inventory management, etc.

In some example embodiments, the term "module" can also refer to a modular hardware component or a component that is a combination of hardware and software. It should be appreciated that implementation and processing of the disclosed modules, whether primarily software-based and/or hardware-based or a combination thereof, according to the approach described herein can lead to improvements in processing speed and ultimately in energy savings and efficiencies in a data-processing system such as, for example, the data-processing system 400 shown in FIG. 23.

The disclosed embodiments can constitute an improvement to a computer system (e.g., such as the data-processing system 400 shown in FIG. 23) rather than simply the use of the computer system as a tool. The disclosed modules, instructions, steps and functionalities discussed herein can result in a specific improvement over prior systems, resulting in improved data-processing systems.

FIGS. 23-24 are intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, including Macintosh, UNIX, LINUX, and the like.

It is understood that the specific order or hierarchy of steps, operations, or instructions in the processes or methods disclosed is an illustration of exemplary approaches. For example, the various steps, operations or instructions discussed herein can be performed in a different order. Similarly, the various steps and operations of the disclosed example pseudo-code discussed herein can be varied and processed in a different order. Based upon design preferences, it is understood that the specific order or hierarchy of such steps, operation or instructions in the processes or methods discussed and illustrated herein may be rearranged. The accompanying claims, for example, present elements of the various steps, operations or instructions in a sample order, and are not meant to be limited to the specific order or hierarchy presented.

The inventors have realized a non-abstract technical solution to the technical problem to improve a computer-technology by improving efficiencies in such computer technology. The disclosed embodiments offer technical improvements to a computer-technology such as a data-processing system, and further provide for a non-abstract improvement to a computer technology via a technical solution to the technical problem(s) identified in the background section of this disclosure. The disclosed embodiments require less time for processing and also fewer resources in terms of memory and processing power in the underlying computer technology. Such improvements can result from implementations of the disclosed embodiments. The claimed solution may be rooted in computer technology in order to overcome a problem specifically arising in the realm of computers and computer networks.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for parking enforcement, comprising:
graphically displaying in at least one graphical user interface screen of a graphical user interface, a mixed reality display of data including at least some augmented reality data comprising parking enforcement information and real-time navigational cues for a navigation that account for a current location of a parking enforcement officer and at least one zone allocated to the parking enforcement officer based on an assigned zone priority with respect to the at least one zone, the at least one graphical user interface screen displaying a plurality of marker pins overlaid on an image or a video displayed in the mixed reality display of data in the at least one graphical user interface screen;
capturing license plate information to determine compliance with curbside regulations;
integrating at least one payment data source and at least one citation issuance application to issue a citation based on the license plate information; and;
contextualizing blockface regulations for the parking enforcement officer by graphically displaying regulation information in at least one marker pin in the plurality of marker pins, wherein
the at least one marker pin is expandable to a new screen that displays detailed information regarding a blockface, wherein the regulation information when displayed in the at least one marker pin or the detailed information regarding the block face displayed in the new screen comprises a decision making aid for the parking enforcement officer, and wherein two or more symbols within the at least one marker pin indicate that the blockface is restricted for at least one of: commercial loading, buses, disabled parking, meter parking and residential parking.

2. The method of claim 1 comprising further contextualizing the blockface regulations to allow the parking enforcement officer to view regulations regarding the blockface in a line of view or along a navigation route of the parking enforcement officer in the mixed reality display of data including the at least some augmented reality data.

3. The method of claim 1 further comprising dynamically rerouting to at least one other zone during the navigation when the parking enforcement officer is out of the at least one zone allocated to the parking enforcement officer.

4. The method of claim 1 further comprising dynamically rerouting to at least one other zone during the navigation to change the at least one zone allocated to the parking enforcement officer while the parking enforcement officer is on duty and to strategically redirect the parking enforcement officer to enforcing routing within at least one new zone.

5. The method of claim 1 further comprising permitting a manager of the parking enforcement manager to view, assign, and modify the at least one zone allocated to the parking enforcement officer.

6. The method of claim 1 further comprising:
contextualizing blockface regulations to allow the parking enforcement officer to view regulations regarding a blockface in a line of view or along a navigation route of the parking enforcement officer; and
dynamically rerouting to at least one other zone during the navigation when the parking enforcement officer is out of the at least one zone allocated to the parking enforcement officer.

7. The method of claim 1 further comprising:
contextualizing blockface regulations to allow the parking enforcement officer to view regulations regarding the blockface in a line of view or along a navigation route of the parking enforcement officer;
dynamically rerouting to at least one other zone during the navigation when the parking enforcement officer is out of the at least one zone allocated to the parking enforcement officer; and
dynamically rerouting to at least one other zone during the navigation to change the at least one zone allocated to the parking enforcement officer while the parking enforcement officer is on duty and to strategically redirect the parking enforcement officer to enforcing routing within at least one new zone.

8. A system for parking enforcement, comprising:
at least one processor and a memory, the memory storing instructions to cause the at least one processor to perform:
graphically displaying in at least one graphical user interface screen of a graphical user interface, a mixed reality display of data including at least some augmented reality data comprising parking enforcement information and real-time navigational cues for a navigation that account for a current location of a parking enforcement officer and at least one zone allocated to the parking enforcement officer based on an assigned zone priority with respect to the at least one zone, the at least one graphical user interface screen displaying a plurality of marker pins overlaid on an image or a video displayed in the mixed reality display of data in the at least one graphical user interface screen;
capturing license plate information to determine compliance with curbside regulations;
integrating at least one payment data source and at least one citation issuance application to issue a citation based on the license plate information; and
contextualizing blockface regulations for the parking enforcement officer by graphically displaying regulation information in at least one marker pin in the plurality of marker pins, wherein
the at least one marker pin is expandable to a new screen that displays detailed information regarding a blockface, wherein the regulation information when displayed in the at least one marker pin or the detailed information regarding the blockface displayed in the new screen comprises a decision making aid for the parking enforcement officer, and wherein two or more symbols within the at least one marker pin indicate that the blockface is restricted for at least one of: commercial loading, buses, disabled parking, meter parking and residential parking.

9. The system of claim 8 wherein the instructions further cause the at least one processor to perform: further contextualizing blockface regulations to allow the parking enforcement officer to view regulations regarding the blockface in a line of view or along a navigation route of the parking enforcement officer.

10. The system of claim 8 wherein the instructions further cause the at least one processor to perform: dynamically rerouting to at least one other zone during the navigation when the parking enforcement officer is out of the at least one zone allocated to the parking enforcement officer.

11. The system of claim 8 wherein the instructions further cause the at least one processor to perform: dynamically rerouting to at least one other zone during the navigation to change the at least one zone allocated to the parking enforcement officer while the parking enforcement officer is on duty and to strategically redirect the parking enforcement officer to enforcing routing within at least one new zone.

12. The system of claim 8 wherein the instructions further cause the at least one processor to perform: permitting a manager of the parking enforcement manager to view, assign, and modify the at least one zone allocated to the parking enforcement officer.

13. The system of claim 8 wherein the instructions further cause the at least one processor to perform:
contextualizing blockface regulations to allow the parking enforcement officer to view regulations regarding a blockface in a line of view or along a navigation route of the parking enforcement officer; and
dynamically rerouting to at least one other zone during the navigation when the parking enforcement officer is out of the at least one zone allocated to the parking enforcement officer.

14. The system of claim 8 wherein the instructions further cause the at least one processor to perform:
contextualizing blockface regulations to allow the parking enforcement officer to view regulations regarding the blockface in a line of view or along a navigation route of the parking enforcement officer;
dynamically rerouting to at least one other zone during the navigation when the parking enforcement officer is out of the at least one zone allocated to the parking enforcement officer; and
dynamically rerouting to at least one other zone during the navigation to change the at least one zone allocated to the parking enforcement officer while the parking enforcement officer is on duty and to strategically redirect the parking enforcement officer to enforcing routing within at least one new zone.

15. A graphical user interface, comprising:
at least one graphical user interface screen;
a mixed reality display of data including at least some augmented reality data comprising parking enforcement information and real-time navigational cues for a navigation that account for a current location of a parking officer and at least one zone allocated to the parking enforcement officer based on an assigned zone priority with respect to the at least one zone, the at least one graphical user interface screen displaying a plurality of marker pins overlaid on an image or a video displayed in the mixed reality display of data in the at least one graphical user interface screen,
wherein license plate information is captured to determine compliance with curbside regulations, and
wherein at least one payment data source and at least one citation issuance application are integrated to issue a citation based on the license plate information; and
wherein blockface regulations are contextualized for the parking enforcement officer by graphically displaying regulation information in at least one marker pin in the plurality of marker pins, wherein
the at least one marker pin is expandable to a new screen that displays detailed information regarding a blockface, wherein the regulation information when displayed in the at least one marker pin or the detailed information regarding the blockface displayed in the new screen comprises a decision making aid for the parking enforcement officer, and wherein two or more symbols within the at least one marker pin indicate that the blockface is restricted for at least one of: commercial loading, buses, disabled parking, meter parking and residential parking.

16. The graphical user interface of claim 15 wherein the blockface regulations are further contextualized to allow the parking enforcement officer to view regulations regarding the blockface in a line of view or along a navigation route of the parking enforcement officer.

17. The graphical user interface of claim 15 wherein dynamically rerouting to at least one other zone occurs during the navigation when the parking enforcement officer is out of the at least one zone allocated to the parking enforcement officer.

18. The graphical user interface of claim 15 wherein dynamically rerouting to at least one other zone occurs during the navigation to change the at least one zone allocated to the parking enforcement officer while the parking enforcement officer is on duty and to strategically redirect the parking enforcement officer to enforcing routing within at least one new zone.

19. The graphical user interface of claim 15 wherein a manager of the parking enforcement manager is permitted to view, assign, and modify the at least one zone allocated to the parking enforcement officer.

20. The graphical user interface of claim 15 wherein:
blockface regulations are contextualized to allow the parking enforcement officer to view regulations regarding a blockface in a line of view or along a navigation route of the parking enforcement officer; and
dynamically rerouting to at least one other zone occurs during the navigation when the parking enforcement officer is out of the at least one zone allocated to the parking enforcement officer.

* * * * *